United States Patent [19]

Matsui

[11] Patent Number: 5,080,736
[45] Date of Patent: Jan. 14, 1992

[54] SYSTEM FOR MOUNTING A HUB TO AN OPTICAL DISK AND A METHOD THEREFOR

[75] Inventor: Takao Matsui, Kawasaki, Japan

[73] Assignee: Matsui Manufacturing Co., Ltd., Kanagawa, Japan

[21] Appl. No.: 467,413

[22] Filed: Jan. 18, 1990

[30] Foreign Application Priority Data

May 26, 1989 [JP] Japan .................................. 1-61588
May 26, 1989 [JP] Japan ................................ 1-134351

[51] Int. Cl.$^5$ ............................................ B32B 31/00
[52] U.S. Cl. ........................................ 156/64; 156/364; 156/378; 156/556
[58] Field of Search ................... 156/64, 364, 378, 379, 156/350, 556

[56] References Cited

U.S. PATENT DOCUMENTS

| | | | |
|---|---|---|---|
| 4,456,938 | 6/1984 | Baasch et al. | 360/104 X |
| 4,458,274 | 7/1984 | Charlson et al. | 360/76 X |
| 4,458,398 | 7/1984 | Goldstein et al. | 360/109 X |
| 4,623,570 | 11/1986 | Alexander et al. | 360/135 X |
| 4,929,822 | 5/1990 | Nakamura et al. | 250/231.16 X |

Primary Examiner—David A. Simmons
Assistant Examiner—James J. Engel, Jr.
Attorney, Agent, or Firm—Frishauf, Holtz, Goodman & Woodward

[57] ABSTRACT

A system for mounting a hub to an optical disk comprises a turntable arranged on an X-Y stage, a loading rod arranged above the turntable and extending vertically, a chuck provided at a lower end of the loading rod, for holding the hub with the axis of the hub aligned with a reference line as the axis of the loading rod, and a pair of displacement sensors for detecting a deviation of the axis of the turntable from the reference line, whereby the X-Y stage is driven in accordance with the signal from the displacement sensors, to position the turntable such that the axis of the turntable is aligned with the reference line. Thereafter, the optical disk is placed on the turntable with the axis of the optical disk aligned with the axis of the turntable, and the hub is placed on the optical disk through an ultraviolet-curing adhesive, by using the loading rod, with the axis of the hub aligned with the axis of the turntable. The system further comprises an ultraviolet radiation device for emitting an ultraviolet radiation onto the adhesive.

19 Claims, 19 Drawing Sheets

Fig. 9
Fig. 10
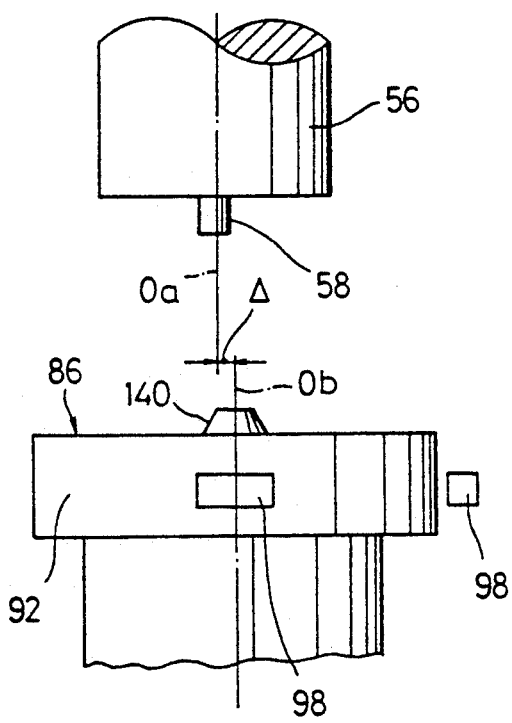
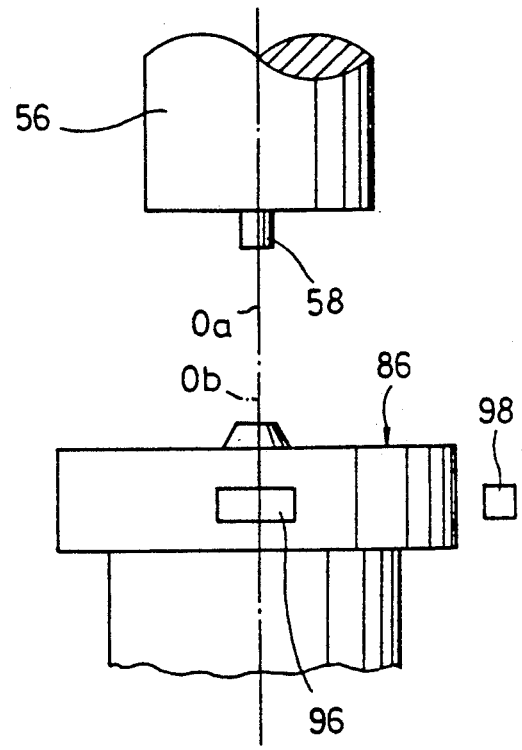

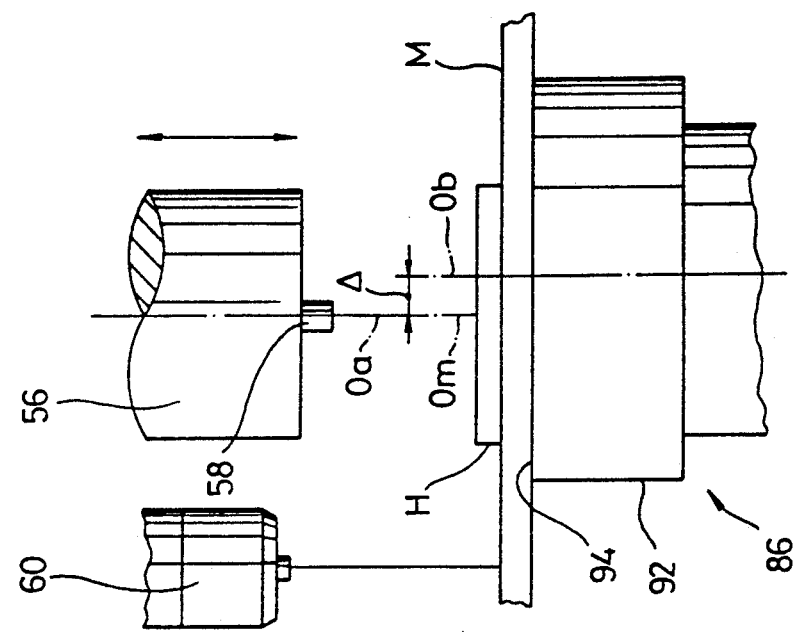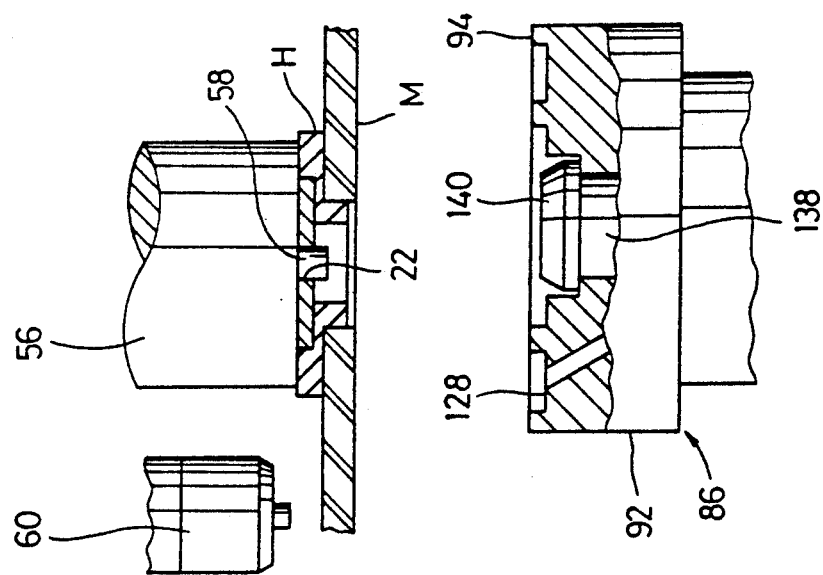

SYSTEM FOR MOUNTING A HUB TO AN OPTICAL DISK AND A METHOD THEREFOR

BACKGROUND OF THE INVENTION

1. Field of the Invention

This invention relates to a system for manufacturing optical disks, and more particularly, to a system and a method for mounting a hub to a data recording optical disk used as a recording medium for an information processing system, such as a computer.

2. Description of the Related Art

Data recording optical disks have much higher information recording density than optical audio disks used as a recording medium for a sound reproduction system. Accordingly, the data recording optical disks must be accurately mounted to the spindle of a disk drive unit, and to this end, a hub is attached at the center of the optical disks and a spindle hole is bored at the center of the hub with high precision.

When mounting the hub to an optical disk, the center of a hub mounting hole of the optical disk must be aligned with the axis of the spindle hole of the hub with high precision. Therefore, conventionally, apparatuses for mounting a hub to an optical disk are provided with a so-called X-Y stage movable in directions perpendicular to each other, and a disk mount is arranged on the X-Y stage. The disk mount has a mount surface facing upward, on which an optical disk is placed, and a mandrel projects from the central portion of the mount surface, to be fitted through the hub mounting hole of the optical disk. Accordingly, when an optical disk is placed on the disk mount with the mandrel fitted through the hub mounting hole of the optical disk, the center of the optical disk is automatically aligned with the axis of the mandrel.

Above the disk mount, moreover, a liftable loading rod is arranged. The loading rod extends vertically and has a chuck at a lower end thereof for accurately positioning the hub and holding the same. Namely, when the hub is held by the chuck, the axis of the spindle hole of the hub and the axis of the loading rod are automatically aligned with each other.

According to the above-described conventional apparatus, the position of the disk mount is adjusted by operating the X-Y stage such that the axis of the mandrel coincides with that of the loading rod, whereby the axis of the mandrel is brought into alignment with the axis of the loading rod, i.e., the origin. Therefore, after carrying out such position adjustment, if a hub is clamped by the chuck of the loading rod and the loading rod is lowered toward an optical disk which has been placed on the mount surface of the disk mount with the aid of the mandrel, the hub can be automatically fitted in the hub mounting hole of the optical disk, with the axis of the spindle hole thereof aligned with the center of the optical disk.

In the aforesaid X-Y stage, however, the axis of the disk mount is occasionally deviated from the axis of the loading rod, namely, from the origin, due to thermal influences such as an increase in ambient temperature or heat produced in the apparatus. Therefore, to ensure high-precision mounting of a hub to an optical disk by using the above-described apparatus, alignment of the axis of the disk mount with the origin, namely, origin adjustment, must be regularly carried out. For example, the alignment may be carried out each time a predetermined number of optical disks have been subjected to the hub mounting process, or at predetermined intervals of time, but this alignment requires much time and thus lowers the rate of operation of the apparatus.

To improve the productivity of optical disks with a hub, on the other hand, not only the time required for the above-described hub mounting process but also the time required for securely fixing the hub to the optical disk after the hub mounting process must be shortened. To this end, an ultraviolet-curing adhesive is used for fixing the hub to the optical disk. More specifically, before actually fitting the hub in the hub mounting hole of the optical disk, an ultraviolet-curing adhesive is applied to a surface of the optical disk to which the hub is to be bonded, i.e., a region of the disk around the hub mounting hole. Simultaneously with the mounting of the hub to the hub mounting hole of the optical disk, the ultraviolet-curing adhesive is irradiated with an ultraviolet radiation through the hub and is cured, whereby the hub can be instantly secured to the optical disk.

Since the ultraviolet radiation is radiated to the adhesive through the hub, as mentioned above, the hub must be made of a material capable of transmitting the ultraviolet radiation therethrough, i.e., a transparent synthetic resin which is also used for the optical disk. On the other hand, to allow high-precision machining of the spindle hole, the spindle hole need be bored through a thin circular plate made of a metal. For this reason, the hub is composed of a transparent body of synthetic resin, and a metal plate having a spindle hole bored therethrough and attached to the body. Hubs of this type are, however, disadvantageous in respect of the number of parts, requiring much labor and cost to manufacture the hubs.

A first object of this invention is to provide a system and a method which permit high-precision mounting of a hub to an optical disk and which can improve the productivity of optical disks with a hub, and a second object of the invention is to provide a system which permits a hub, made solely of a metallic material, to be bonded to an optical disk by using an ultraviolet-curing adhesive.

SUMMARY OF THE INVENTION

The first object is achieved by a system according to the invention which comprises: chuck means, having a reference line and including a movable chuck for detachably holding a hub and moving the same along the reference line with an axis of the hub aligned with the reference line; a movable station movable in a plane perpendicular to the reference line; a turntable provided at the movable station and rotatable about an axis thereof, the turntable having an axis parallel to the reference line, and a table surface parallel to the plane and opposed to the chuck at a distance therefrom for carrying an optical disk thereon; holding means for detachably holding the optical disk at the table surface of the turntable, with an axis of the optical disk aligned with the axis of the turntable; detecting means for detecting a deviation of the axis of the turntable from the reference line and providing a deviation signal corresponding to the detected deviation; positioning means for controlling movement of the movable station in accordance with the deviation signal from the detecting means, to position the movable station such that the axis of the turntable is aligned with the reference line; chuck moving means for moving the chuck holding the hub toward the turntable with the axis of the turntable aligned with the reference line, and placing the hub on the optical disk; and fixing means for securing the hub placed on the optical disk to the optical disk.

According to the system of the invention, the detecting means and the positioning means are provided, as mentioned above, and accordingly, alignment of the axis of the hub with that of the optical disk is automatically carried out beforehand when the hub is to be mounted to the optical disk placed on the turntable. Therefore, not only the hub can be accurately mounted to the optical disk, but also the rate of operation of the system can be improved, whereby the productivity of optical disks with a hub is increased.

In the system of this invention, the detecting means may include displacement sensors for detecting a deviation of the axis of the turntable from the reference line, or may include a master optical disk.

In the case of using the master optical disk, the master optical disk is placed on the turntable with an axis thereof aligned with the reference line, and the detecting means includes an optical pickup for following a reference track of the master optical disk when the master optical disk is rotated together with the turntable, the optical pickup being movable in a radial direction of the turntable in a plane parallel to the table surface; a displacement sensor for detecting a displacement of the optical pickup and providing a displacement signal corresponding to the detected displacement when the optical pickup is following the reference track; and a rotary encoder for detecting an angle of rotation of the turntable and providing an angle signal.

In this case, the positioning means includes an electronic controller which receives the displacement signal from the displacement sensor and the angle signal from the rotary encoder, calculates a distance by which the axis of the master optical disk is deviated from the axis of the turntable and a direction of the deviation, in accordance with the displacement signal and the angle signal, and which provides a deviation signal corresponding to the distance and direction of the deviation thus calculated; and a driver for receiving the deviation signal from the electronic controller to drive the movable station.

The second object of the invention is achieved by a system in which the aforesaid fixing means comprises an applicator for applying an ultraviolet-curing adhesive to a surface of the optical disk on which the hub is to be placed, to form an adhesive layer, when the optical disk is placed on the table surface of the turntable; an ultraviolet reflection surface provided at the table surface of the turntable; and an ultraviolet radiation device for radiating an ultraviolet radiation onto the ultraviolet reflection surface through the optical disk when the hub is placed on the optical disk with the adhesive layer therebetween, the ultraviolet radiation being reflected by the ultraviolet reflection surface and radiated to the adhesive layer through the optical disk.

In this case, the ultraviolet radiation emitted from the ultraviolet radiation device is radiated to the adhesive layer not through the hub, and accordingly, the hub can be made of a metallic material only.

The above and other embodiments of this invention and advantages thereof will become apparent from the ensuing detailed description taken in connection with the accompanying drawings.

BRIEF DESCRIPTION OF THE DRAWINGS

FIGS. 9 and 10 are diagrams illustrating positioning of the disk mount;

FIGS. 16 to 19 are diagrams showing a second embodiment of this invention, in which is illustrated a process of positioning a disk mount by using a master optical disk;

DETAILED DESCRIPTION OF THE PREFERRED EMBODIMENTS

Figure 1:
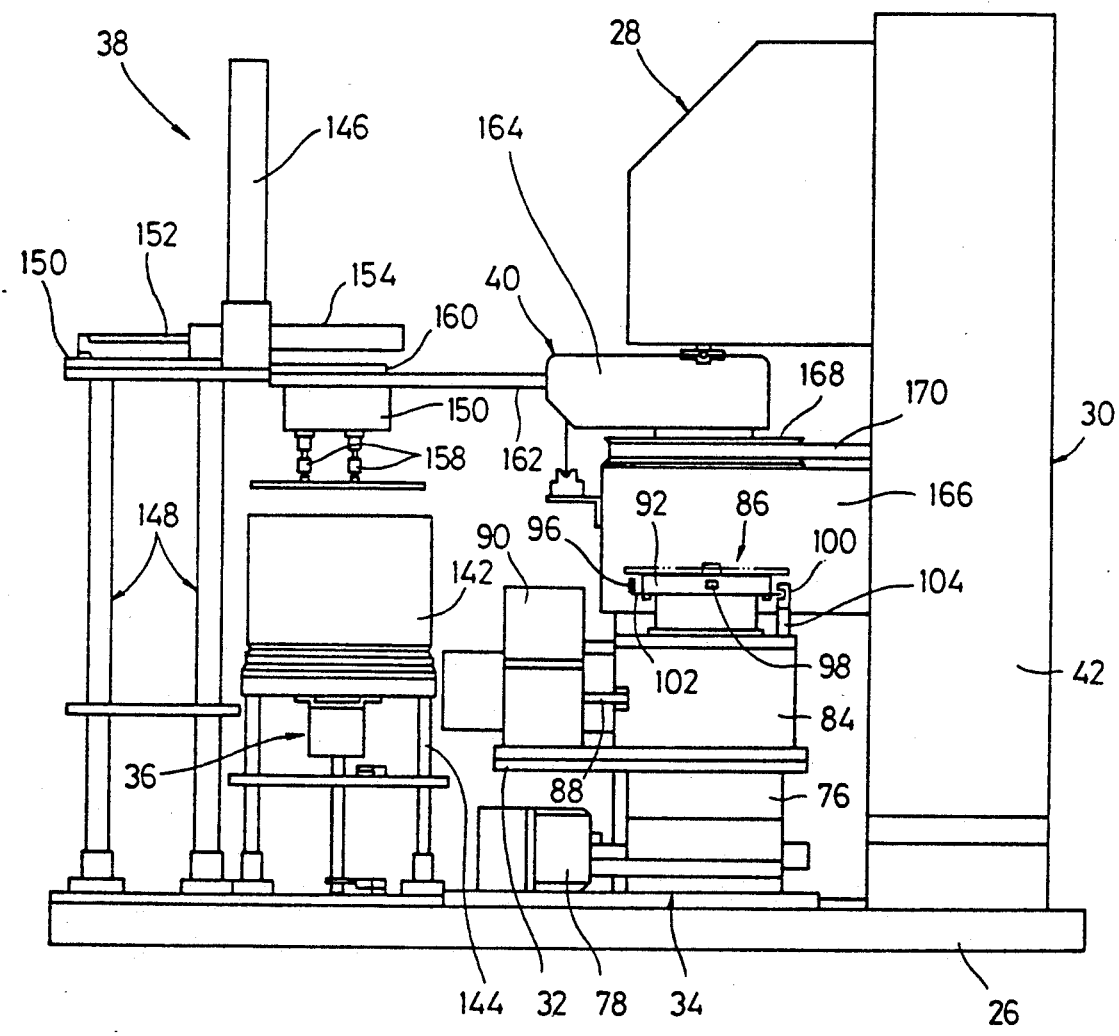
FIG. 1 is a schematic view of an entire system according to a first embodiment of this invention.

Referring to FIG. 1, there is illustrated a system for mounting a hub to an optical disk. Before explaining this system, an optical disk with a hub, manufactured by using the system, will be described with reference to FIGS. 2 and 3.

Figure 2:
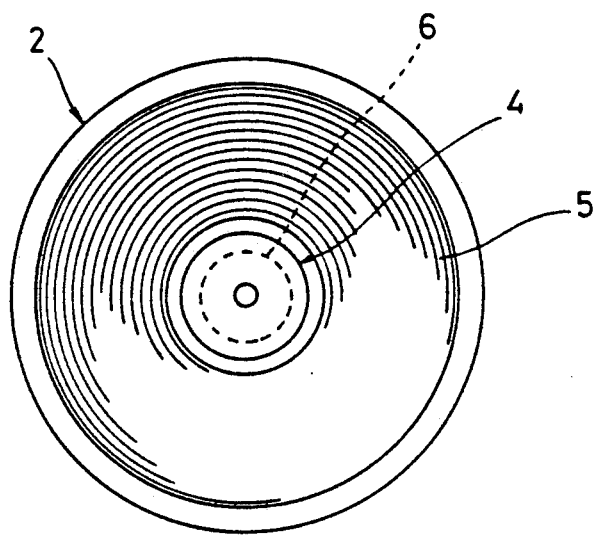
FIG. 2 is a plan view of an optical disk with a hub.
Figure 3:
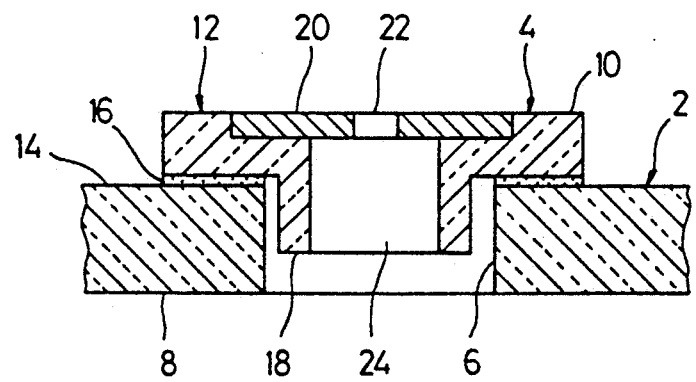
FIG. 3 is a sectional view of part of the optical disk with a hub, shown in FIG. 2.

As shown in FIG. 2, the disk comprises an optical disk 2 and a hub 4. The optical disk 2 is made of a transparent synthetic resin, and has a hub mounting hole 6 bored through the central portion thereof. On one surface 8 of the optical disk 2 are formed a large number of pits corresponding to data to be stored, in the circumferential direction of the optical disk. These pits are so arranged as to form one spiral recording track 5 having a center, and the distance between adjacent turns of the track in the radius direction of the optical disk 2, i.e., the track pitch, is approximately 1.6 μm. The illustrated optical disk 2 is not yet coated with a reflective layer or protective layer on the data recording surface 8 thereof.

The hub 4 has a body 10 made of a transparent synthetic resin like the optical disk 2. The body 10 has a circular platelike portion 12 having a diameter larger than that of the hub mounting hole 6 of the optical disk 2 and secured to the other surface 14 of the optical disk 2 by an ultraviolet-curing adhesive 16. The adhesive 16 is applied to an annular region of the surface 14 around the hub mounting hole 6.

A cylindrical portion 18 integrally projects from one surface of the resin platelike portion 12 bonded to the optical disk 2, in concentricity with the platelike portion 12, and is inserted into the hub mounting hole 6 by a predetermined distance. Namely, the outer diameter of the cylindrical portion 18 is smaller than the bore diameter of the hub mounting hole 6, and a predetermined gap is present between the end face of the cylindrical portion 18 and the data recording surface 8 of the optical disk 2.

A circular recess is formed in the other surface, i.e., the surface exposed to the outside, of the resin platelike portion 12 concentrically therewith, and a thin circular plate 20 made of a magnetic material, e.g., a metal such as iron, is securely fitted in the recess. The upper surface of the metal plate 20 is flush with that of the resin platelike portion 12. The metal plate 20 has a spindle hole 22 bored concentrically therethrough, which hole has an inner diameter thereof machined with high precision and through which a spindle of a disk drive unit (not shown) is passed. Accordingly, when an optical disk with the aforesaid hub is loaded in the disk drive unit, the spindle of the drive unit is inserted through the spindle hole 22 of the hub 4, thereby permitting rotation of the optical disk. In the cylindrical portion 18 of the hub 4, a hole 24 communicating with the spindle hole 22 and having a diameter larger than that of the spindle hole 22 is formed.

The aforementioned system shown in FIG. 1 is used to mount the hub 4 to the optical disk 2, and comprises a base 26 placed on a vibration-insulating platform (not shown); a vertically movable stage arranged on the right edge of the base 26, as viewed in FIG. 1, i.e., a section 30 including a Z-axis stage 28; a horizontally movable stage located under the vertically movable stage 28 and set on the base 26, i.e., a section 34 including an X-Y stage 32; a store section 36 arranged on the base 26 at the left side of the section 34, for storing a large number of optical disks 2; a store section 38 arranged above the store section 36, for storing a large number of hubs 4; and a feed section 40 for extracting the optical disks 2 and the hubs 4, one by one, from the store sections 36 and 38, respectively, and feeding the optical disks 2 to the X-Y stage 32 and the hubs 4 to the Z-axis stage 28.

Figure 4:
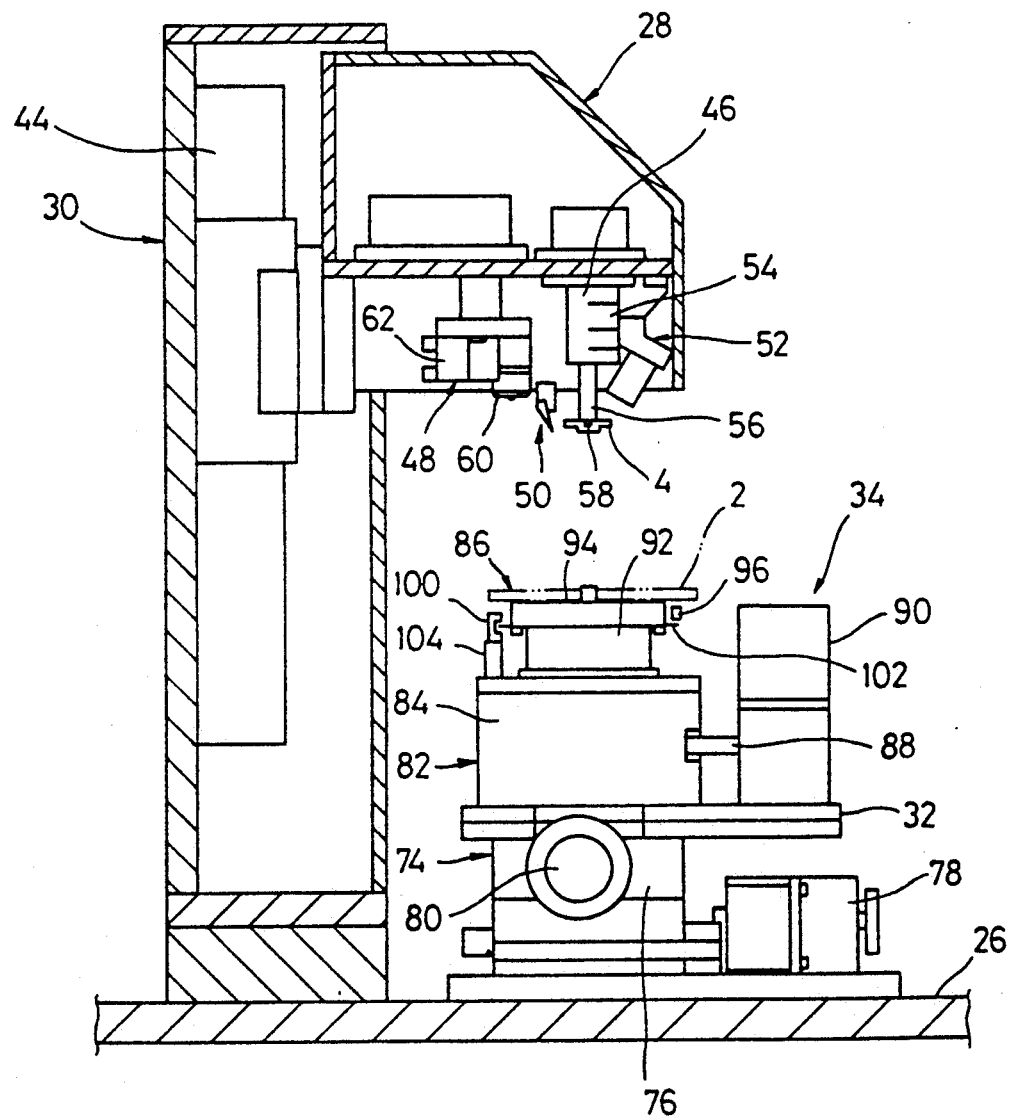
FIG. 4 is a partially sectional rear view of the system in FIG. 1.

The section 30 is provided with a box-like support frame 42 set on the base 26. As shown in FIG. 4, a guide rail 44 extending vertically is securely arranged inside the support frame 42, and the Z-axis stage 28 is mounted to the guide rail 44 such that it protrudes from the support frame 42. The Z-axis stage 28 can be moved in the vertical direction by an air cylinder (not shown) while being guided by the guide rail 44.

The Z-axis stage 28 is in the form of a box open at a lower side, and inside the stage 28 are arranged a chuck device 46 for holding the hub 4, a tracking device 48 for inspecting the track of the optical disk 2, a nozzle 50 for discharging an ultraviolet-curing adhesive downward, and an ultraviolet radiation device 52 for emitting an ultraviolet radiation downward.

The chuck device 46 includes an electromagnet 54 having a yoke, which extends downward in the vertical direction and a portion of which serves as a loading rod 56 for the hub 4. The loading rod 56 has a diameter slightly smaller than that of the metal plate 20 of the hub 4, and a pin 58 integrally projects from the lower end face of the rod 56. The pin 58 can be inserted through the spindle hole 22 of the hub 4, and accordingly, when the electromagnet 54 is energized with the pin 58 inserted through the spindle hole 22 and the metal plate 20 of the hub 4 disposed in contact with the lower end face of the loading rod 56, the hub 4 is attracted to the loading rod 56 and held thereby.

The tracking device 48 includes an optical pickup 60, a driving unit 62 for driving the optical pickup 60, and a control circuit 64 for controlling the operation of the driving unit 62. The optical pickup 60 comprises a semiconductor laser for emitting a laser beam downward, an objective lens for focusing the laser beam from the semiconductor laser, a detector for receiving the laser beam reflected by the optical disk 2, and other elements.

Figure 5:
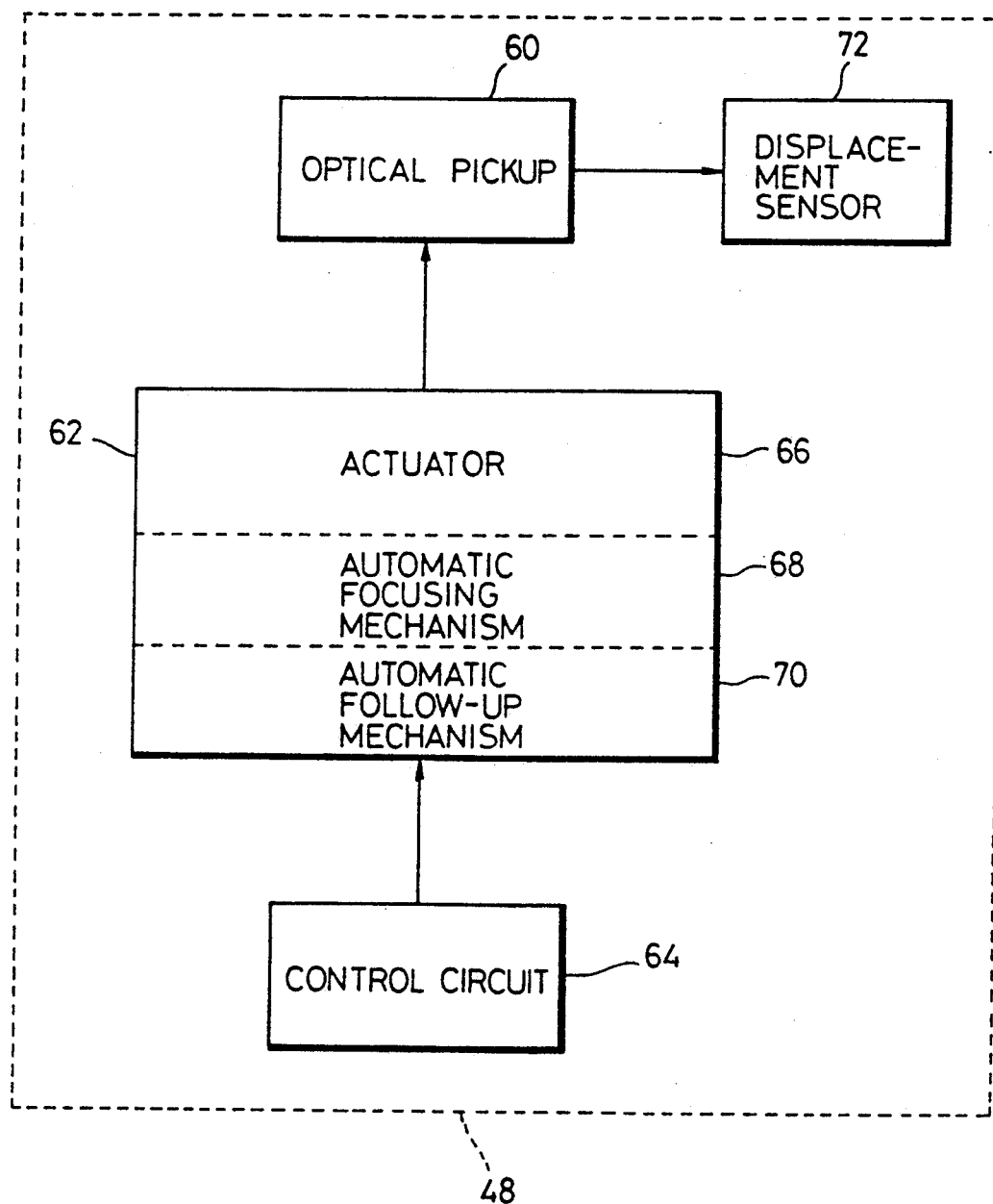
FIG. 5 is a block diagram showing a tracking device.

As clearly shown in the block diagram of FIG. 5 illustrating the tracking device 48, the driving unit 62 comprises an actuator 66 for vertically moving the optical pickup 60, an automatic focusing mechanism 68 for carrying out a fine adjustment of the vertical position of the optical pickup 60 such that the focal point of the optical pickup 60 is on the track of the optical disk 2, when a laser beam is emitted from the optical pickup 60 toward the optical disk 2, and an automatic follow-up mechanism 70 for carrying out a fine adjustment of the horizontal position of the optical pickup 60 such that the focal point of the pickup 60 follows the track, when the optical disk 2 is rotated.

The tracking device 48 further includes a displacement sensor 72 for detecting a displacement of the optical pickup 60 during operation of the automatic follow-up mechanism 70.

The section 34 is provided with a support unit 74 arranged on the base 26. The support unit 74 has a table 76 which is movable horizontally, namely, in parallel to the base 26 and, in this embodiment, in a direction toward and away from the support frame 42 of the section 30, and the above-mentioned X-Y stage 32 is arranged on this movable table 76. The X-Y stage 32 is mounted on the movable table 76 such that it is movable in a direction perpendicular to the direction in which the movable table 76 is allowed to move. Accordingly, the X-Y stage 32 can be moved independently in directions perpendicular to each other in a horizontal plane, namely, in X and Y directions.

Although not illustrated in detail, the movable table 76 engages with a feed screw extending in the X direction, and the X-Y stage 32 engages with a feed screw extending in the Y direction, these two feed screws being coupled to an X-axis driving motor 78 and a Y-axis driving motor 80, respectively. Accordingly, by independently operating the driving motors 78 and 80, the X-Y stage 32 can be moved independently in the X and Y directions. The driving motors 78 and 80 each comprise a pulse motor, and therefore, the X-Y stage 32 can be positioned in the X and Y directions with high accuracy.

A rotary head 82 is arranged on the X-Y stage 32 and has a cylindrical head housing 84 for rotatably supporting a cylindrical disk mount 86. The disk mount 86 has an upper portion projecting from the upper surface of the head housing 84, and a lower portion provided with a driving pulley (not shown). An endless driving belt 88 is wound around the driving pulley and extended out of the head housing 84 into a motor housing 90 arranged on the X-Y stage 32 by the side of the head housing 84. The motor housing 90 contains, though not illustrated, a motor and an output pulley coupled to the output shaft of the motor. Accordingly, by winding the aforesaid driving belt 88 around the output pulley, the rotating force of the motor can be transmitted to the disk mount 86 to rotate the same.

The upper portion of the disk mount 86 is formed as a turntable portion 92 larger in diameter than the lower portion thereof. The turntable portion 92 has a diameter larger than that of the optical disk 2 and has a horizontal surface serving as a mount surface 94 on which the optical disk 2 is placed.

Figure 6:
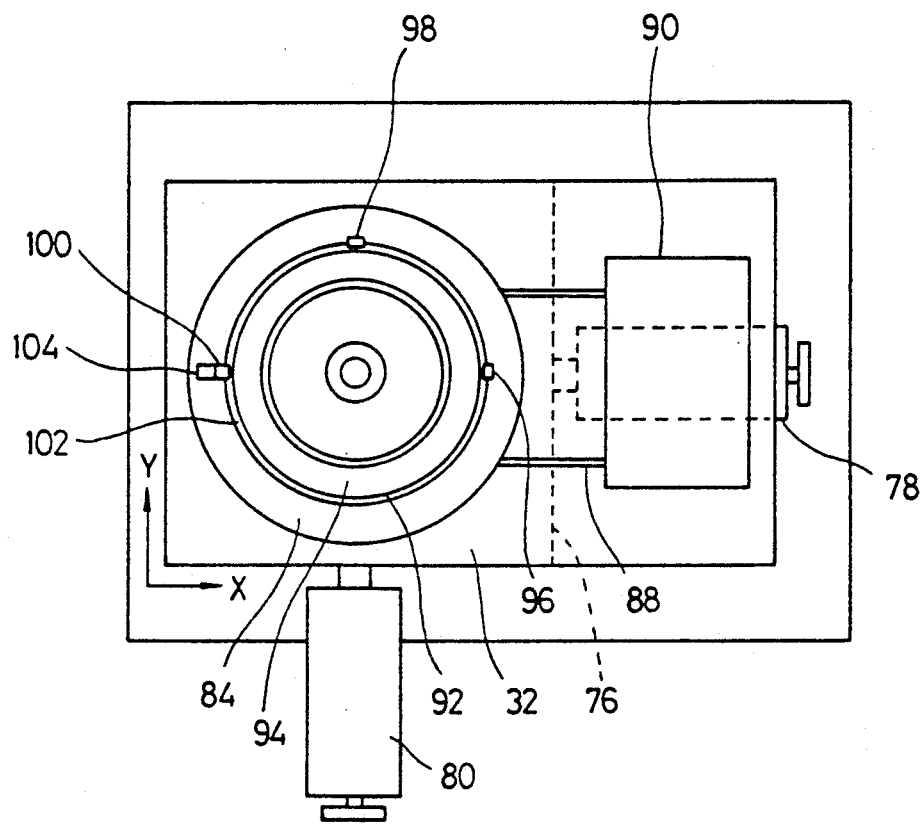
FIG. 6 is a plan view of an X-Y stage.

In the proximity of the turntable portion 92 are arranged an X-axis displacement sensor 96 and a Y-axis displacement sensor 98 for detecting a displacement of the turntable portion 92 in the X and Y directions, respectively. As shown in FIGS. 1 and 4, the displacement sensors 96 and 98 are arranged close to the peripheral surface of the turntable portion 92 in a facing relation thereto, and are secured to a fixing member at the base side by supporting means (not shown). The arrangement of the displacement sensors 96 and 98 will be clearly understood from FIG. 6. Namely, the X-axis displacement sensor 96 is arranged on the same side as the driving motor 78 and in a vertical plane including the output shaft of the driving motor 78, and the Y-axis displacement sensor 98 is arranged on a side opposite the driving motor 80 and in a vertical plane including the output shaft of the driving motor 80. In this embodiment, the displacement sensors 96 and 98 each comprise an eddy-current type sensor, and therefore, the turntable portion 92 is made of an electrically conductive metallic material, such as iron, etc.

A rotary encoder 100 is also arranged in the vicinity of the peripheral surface of the turntable portion 92, and cooperates with a detection disc 102 attached to the lower surface of the turntable portion 92, to provide a signal representing an angle of rotation of the turntable portion 92. The rotary encoder 100 is supported by the aforesaid head housing 84 through a support member 104.

The displacement sensors 96 and 98 respectively provide a signal representing a distance therefrom to the peripheral surface of the turntable portion 92.

Output signals Vx and Vy of the displacement sensors 96 and 98 are respectively applied to comparators 108 and 110 of a control circuit 106. Values Vx0 and Vy0 corresponding to reference signals are previously set in the comparators 108 and 110, respectively. The values Vx0 and Vy0 are respectively equal to the values of signals output from the displacement sensors 96 and 98 when the axis of the disk mount 86 is aligned with the axis of the loading rod 56, i.e., the pin 58, of the aforesaid Z-axis stage 28. Namely, in the hub mounting system of this invention, the axis of the pin 58 is defined as the origin, and accordingly, when the axis of the disk mount 86 coincides with the origin, the displacement sensors 96 and 98 deliver signals Vx and Vy having the values Vx0 and Vy0, respectively.

The comparators 108 and 110 compare the values of the output signals Vx and Vy of the displacement sensors 96 and 98 respectively with the reference values Vx0 and Vy0, and apply the resulting differential signals to drivers 112 and 114, respectively. The drivers 112 and 114 output drive signals Vxc and Vyc corresponding to the differential signals to the driving motors 78 and 80 associated therewith, which then are operated in accordance with the drive signals Vxc and Vyc, respectively, such that the axis of the disk mount 86 is brought to a position coincident with the aforesaid origin, by means of the X-Y stage 32.

Figure 7:
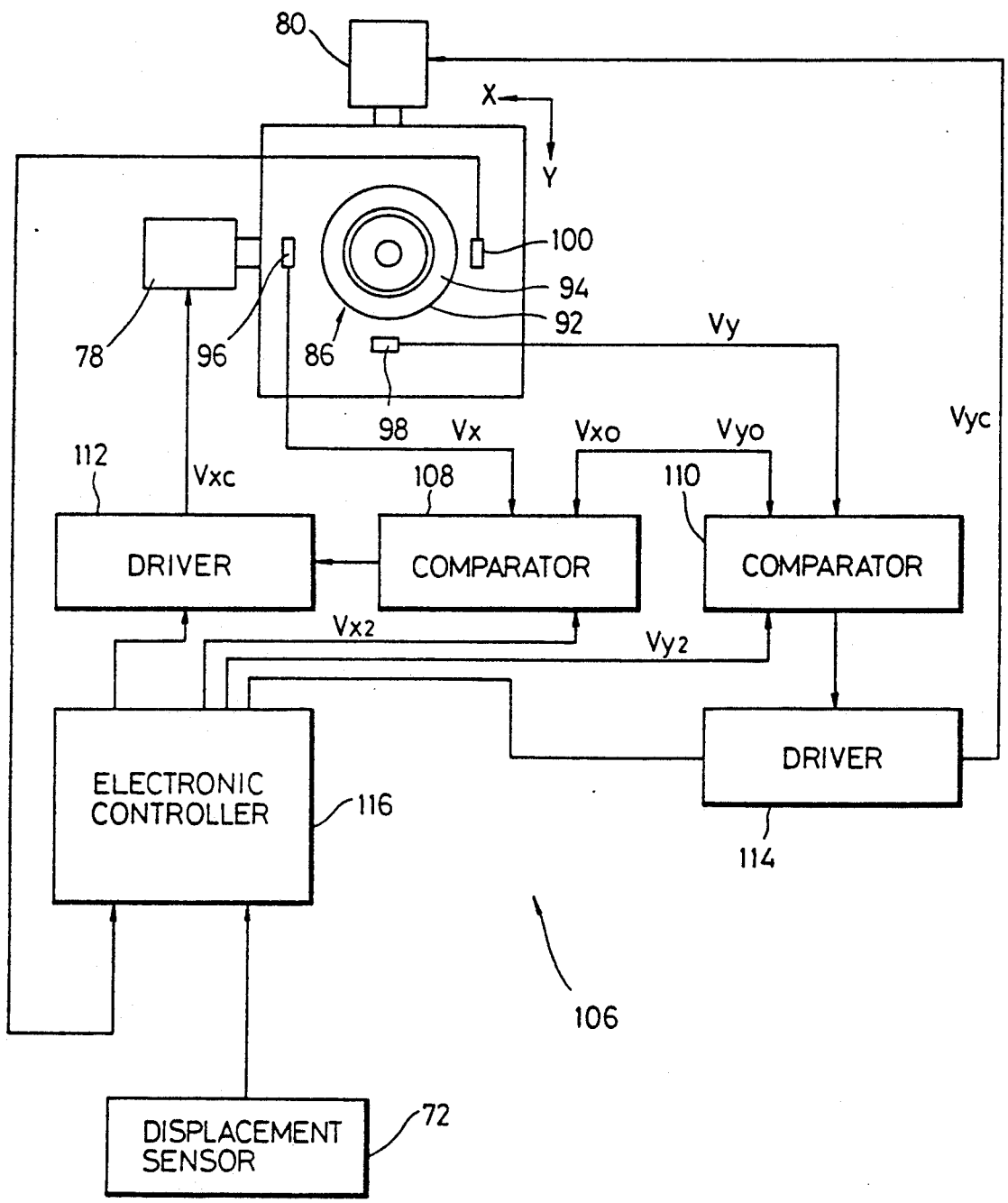
FIG. 7 is a block diagram showing a mechanism for positioning the X-Y stage.

As shown in FIG. 7, the control circuit 106 is further provided with an electronic controller 116 comprising a microcomputer or the like. The electronic controller 116 is supplied with the output signals of the aforesaid rotary encoder 100 and the displacement sensor 72. Based on the output signals from the rotary encoder 100 and the displacement sensor 72, the electronic controller 116 supplies control signals to the drivers 112 and 114, to control the operation of the driving motors 78 and 80, as described hereinafter.

Figure 8:
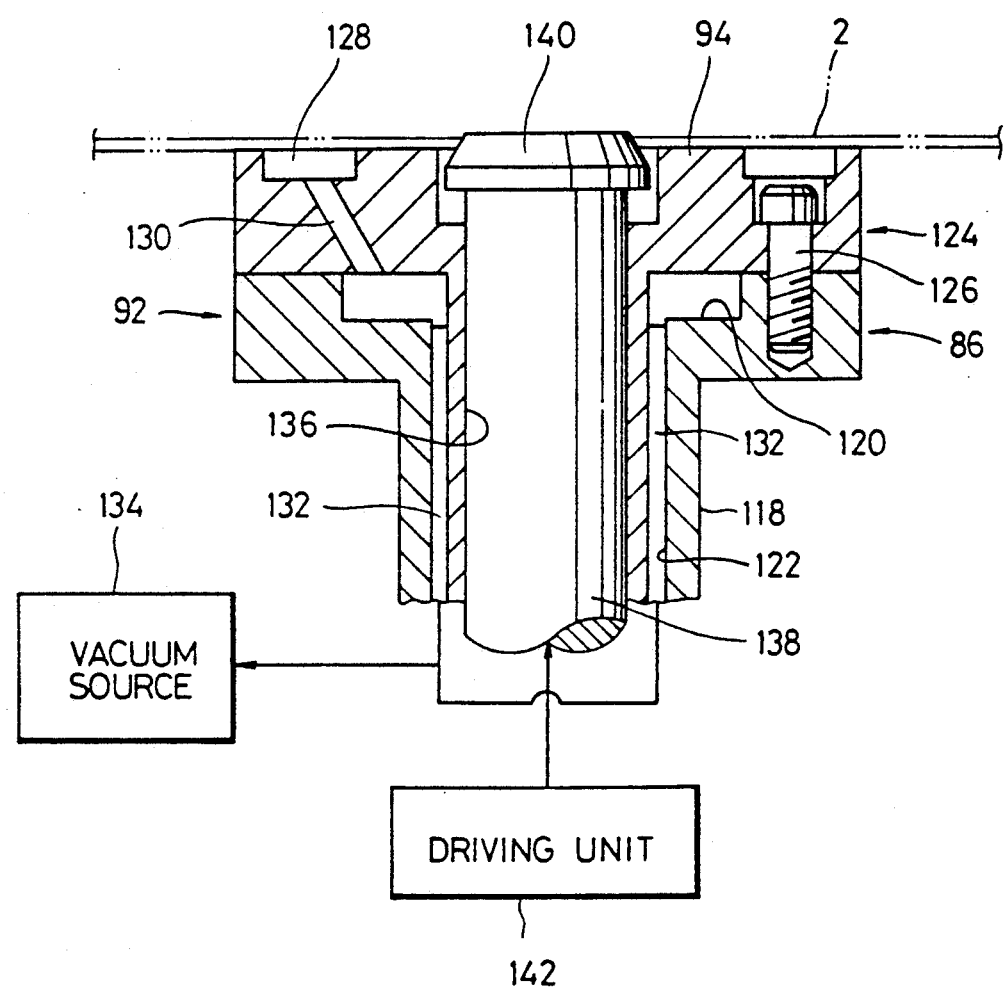
FIG. 8 is a sectional view of part of a disk mount.

FIG. 8 shows the interior of the turntable portion 92 of the disk mount 86 in detail. The disk mount 86 includes a first cylindrical member 118 having an upper end portion thereof enlarged in diameter. A circular recess 120 is formed in the upper surface of the first cylindrical member 118 concentrically therewith, and an axial hole 122 communicating at an upper end thereof with the recess 120 is bored through the first cylindrical member 118 concentrically therewith. The disk mount 86 further includes a second cylindrical member 124 which has an upper end portion equal in diameter to the upper end of the first cylindrical member 118, and a lower portion serving as a shaft portion inserted into the axial hole 122 of the first cylindrical member 118. Therefore, as seen from FIG. 8, the shaft portion of the second cylindrical member 124 is inserted into the axial hole of the first cylindrical member 118, such that the upper end portion of the second cylindrical member 12 lies on the upper end portion of the first cylindrical member 118. The upper end portions of the first and second cylindrical members 118 and 124 are clamped together by a plurality of connecting bolts 126, and therefore, the aforesaid turntable portion 92 is constituted by the upper end portions of the first and second cylindrical members 118 and 124.

An annular groove 128 is formed in the upper surface of the second cylindrical member 124, i.e., the mount surface 94 of the turntable portion 92, at an edge portion thereof. The annular groove 128 is in communication with the recess 120 through a connection hole 130 formed in the upper end portion of the second cylindrical member 124. The recess 120 is connected to a vacuum source 134, e.g., a vacuum pump or the like, through a plurality of axial passages 132 defined between the inner surface of the axial hole 122 of the first cylindrical member 118 and the shaft portion of the second cylindrical member 124. The axial passages 132 are formed by a plurality of axial grooves cut in the peripheral surface of the shaft portion of the second cylindrical member 124.

A stepped hole 136 enlarged in diameter at an upper end thereof is bored through the second cylindrical member 124 concentrically therewith and opens in the mount surface 94 of the turntable portion 92 at the upper end thereof. A positioning pin 138 for the optical disk 2 is slidably fitted through the stepped hole 136 and has an upward tapered portion 140 at an upper end thereof. The tapered portion 140 has a diameter larger than the remaining portion of the positioning pin 138 but smaller than the diameter of the upper end portion of the stepped hole 136. More specifically, the minimum diameter of the tapered portion 140 at the extreme end thereof is smaller than the the diameter of the hub mounting hole 6 of the optical disk 2, and the maximum diameter of the tapered portion 140 is set to a value larger than the diameter of the hub mounting hole 6.

The positioning pin 138 is coupled at an lower end thereof to a driving unit 142, as indicated by a rectangle in FIG. 7. The driving unit 142 has the function of vertically moving the positioning pin 138, whereby the positioning pin 138, i.e., the tapered portion 140 thereof, can be projected from the mount surface 94 of the turntable portion 92 and can be completely retracted into the turntable portion 92, namely, the upper end portion of the stepped hole 136.

Note, the axis of the disk mount 86 is in alignment with that of the positioning pin 138, and because the axis of the disk mount 86 is aligned with the aforementioned origin, the axis of the positioning pin 138 is also in alignment with the origin.

Referring to FIG. 1, the aforesaid store sections 36 and 38 and the feed section 40 will be described.

First, the section 36 has a cylindrical containing case 142 open at an upper end thereof and placed on a support stand 144. A large number of stacked optical disks 2 are contained in the case 142. Although not illustrated in detail, the bottom wall of the containing case 142 is vertically movable so that the uppermost one of the optical disks 2 stacked within the case 142 can be positioned at a predetermined level.

The section 38 has a containing cylinder 146 located above the containing case 142 and supported by a plurality of posts 148 and a table 150. The containing cylinder 146 extends upward, as shown in FIG. 1, and is open at an upper end thereof, so that hubs 4 can be supplied through the upper open end of the cylinder 146 and the cylinder 146 can contain a large number of hubs 4 stacked one upon another.

At the lower end portion of the containing cylinder 146, a hub outlet port (not shown) is formed which is open at the right side of the cylinder 146, as viewed in FIG. 1, and which has dimensions such that only the lowermost one of the hubs 4 stacked in the cylinder 146 is allowed to pass therethrough. A pusher 152 is arranged on the support table 150 and serves to push the lowermost one of the hubs 4 in the containing cylinder 146 out of the hub outlet port. A discharge guide 154 is connected to the hub outlet port and has the function of guiding the hub 4, namely, it receives the hub discharged from the outlet port and allows it to drop therefrom. The discharge guide 154 and the aforementioned containing case 142 are arranged on the same vertical line.

The feed section 40 has a feed head 156 which is located, as viewed in FIG. 1, between the guide 154 and the containing case 142. The feed head 156 has a plurality of telescopic vacuum chucks 158 extending downward and connected to the aforesaid vacuum source. Accordingly, as the vacuum chucks 158 are extended when the feed head 156 is located at the position illustrated in FIG. 1, the chucks 158 enter the containing case 142, and upon coming into contact with the uppermost optical disk 2 in the containing case 142, the vacuum chucks 158 are connected to the vacuum source, whereby the optical disk 2 is sucked by the chucks 158. Then, the vacuum chucks 158 are retracted, thereby extracting one optical disk 2 from the containing case 142, as shown in FIG. 1.

A receiving guide 160 is provided on the upper surface of the feed head 156 and located, as viewed in FIG. 1, just under the aforesaid discharge guide 154, such that the hub 4 discharged to the discharge guide 154 from the containing cylinder 146 is received and retained by the receiving guide 160.

The above-described feed head 156 is supported by a distal end of a horizontal arm 162, the proximal end of which is coupled to a swing carriage 164 at the section (30) side, as shown in FIG. 1. The swing carriage 164 is swingably supported through a rotating shaft thereof by a support frame 166 arranged on the base 26. The rotating shaft of the swing carriage 164 is provided with a driving pulley 168 which is coupled to a driving power source (not shown) by an endless driving belt 170. In this embodiment, the driving power source comprises a driving motor arranged within the support frame 42 of the section 30, and a pulley attached to the output shaft of this motor and engaged with the driving belt 170. As the swing carriage 164 is swung by the driving power source over 90° about the rotating shaft thereof, the aforesaid feed head 156 is also turned simultaneously and brought to a feed position just under the chuck device 46 of the Z- axis stage 28 and above the disk mount 86 of the X-Y stage 32. The arrangement of the containing case 142 and the disk mount 86 relative to the rotating shaft of the swing carriage 164 is such that, when viewed from above, the containing case 142 and the disk mount 86 are located on the same circle having a center thereof coinciding with the rotating shaft of the swing carriage 164.

When the feed head 156 holding one optical disk 2 and one hub 4 is located at the feed position, as mentioned above, the spindle hole 22 of the hub 4 on the receiving guide 160 of the feed head 156 is located right under the pin 58 of the loading rod 56 and the optical disk 2 sucked by the vacuum chucks 158 of the feed head 156 is located right above the disk mount 86.

As the electromagnet 54 of the chuck 46 is energized thereafter, the metal plate 20 of the hub 4 or the hub 4 is attracted by the loading rod 56 and retained at the lower end thereof, with the pin 58 of the loading rod 56 inserted through the spindle hole 22 of the hub 4. On the other hand, the optical disk 2 carried by the feed head 156 is brought to a position right above the disk mount 86 by extending the vacuum chucks 158. Then, the suction of the optical disk 2 by the vacuum chucks 158 is stopped, and accordingly, the tapered portion 140 of the positioning pin 138 of the disk mount 86 is fitted into the hub mounting hole 6 of the optical disk 2, whereby the optical disk 2 is fed to the disk mount 86.

Now, the operation of the mounting system of this embodiment will be described.

First, in the system, it is determined whether the axis of the disk mount 86, i.e., the axis of the positioning pin 138, is in alignment with the axis of the loading rod 56, i.e., the origin, before the hub 4 and the optical disk 2 are fed to the loading rod 56 of the Z-axis stage 28 and to the disk mount 86, respectively, in the aforesaid manner. Here, assuming that the axis Ob of the disk mount 86 is deviated by $\Delta$ from the origin, i.e., the axis Oa of the loading rod 56, then the deviation $\Delta$ is given by $$\Delta = (\Delta x^2 + \Delta y^2)^{\frac{1}{2}}$$

where $\Delta x$ and $\Delta y$ are the distances by which the axis Ob is deviated from the axis Oa in the X-axis and Y-axis directions, respectively. Accordingly, the displacement sensors 96 and 98 supply signals Vx and Vy corresponding to the deviated distances $\Delta x$ and $\Delta y$ to the comparators 108 and 110, respectively. The comparator 108 compares the value of the signal Vx with the reference value Vx0, and supplies the obtained difference to the driver 112 as a differential signal $\Delta$Vx. The comparator 110 compares the value of the signal Vy with the reference value Vy0, and supplies the obtained difference to the driver 114 as a differential signal ΔVy.

The drivers 112 and 114 supply drive signals Vxc and Vyc corresponding to the differential signals ΔVx and ΔVy to the driving motors 78 and 80, respectively, whereby the X-Y stage 32, namely, the disk mount 86, is moved by Δx in the X-axis direction and by Δy in the Y-axis direction, and accordingly, the axis Ob of the disk mount 86 is brought into alignment with the axis Oa of the loading rod 56, as shown in FIG. 10. In FIGS. 9 and 10, the disk mount 86 and the loading rod 56 are illustrated as they are located close to each other, for better understanding.

Figure 11:
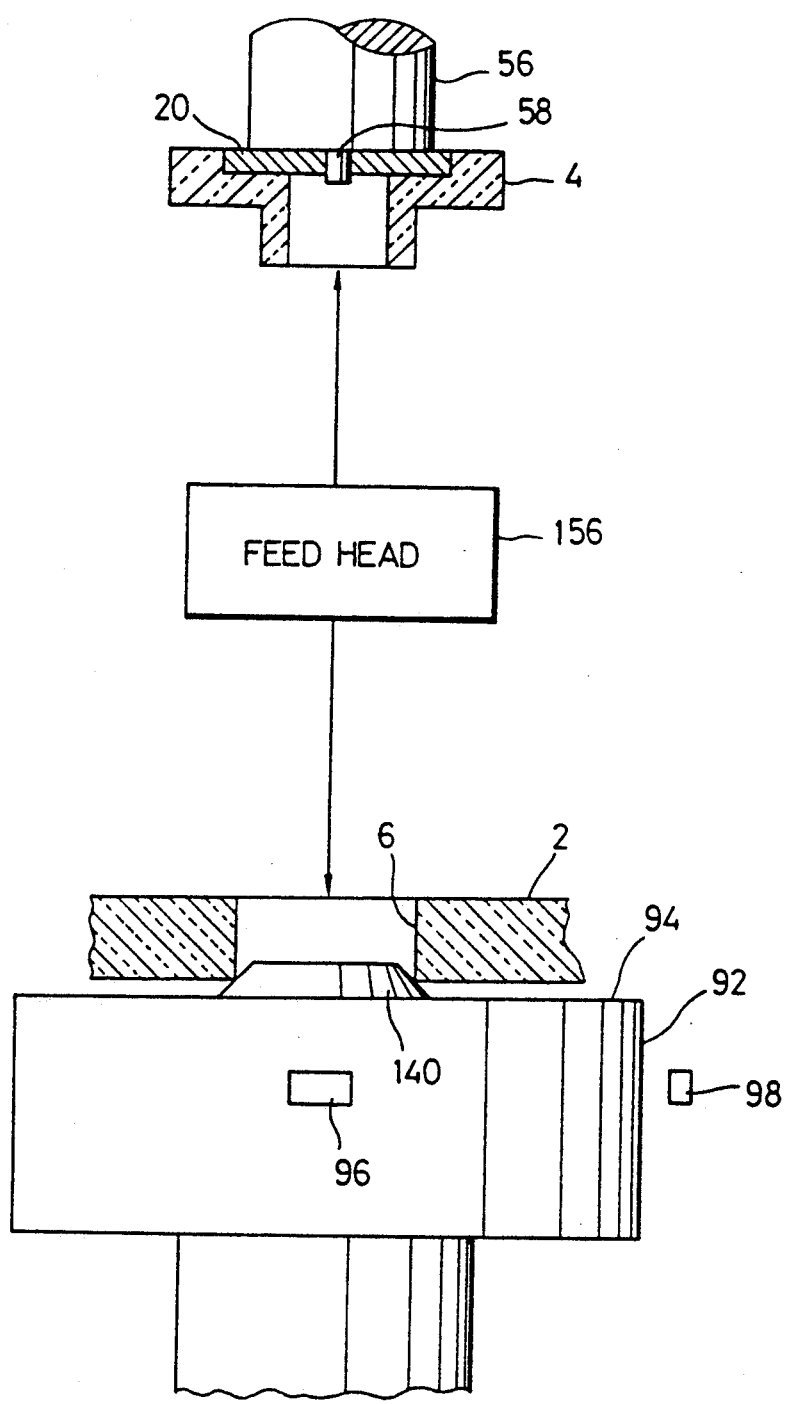
FIGS. 11 to 15 are diagrams illustrating in sequence a process of bonding a hub to an optical disk, carried out by using the system of FIG. 1.

After the alignment of the disk mount 86 with the origin is carried out in the aforementioned manner, the loading rod 56 and the disk mount 86 are respectively fed with the hub 4 and the optical disk 2, by the feed head 156, as shown in FIG. 11. As seen from FIG. 11, the optical disk 2 is not entirely brought into contact with the mount surface 94 of the turntable portion 92 of the disk mount 86, but the tapered portion 140 of the positioning pin 138 is just partly fitted into the hub mounting hole 6 of the optical disk 2. Accordingly, in this state, the axis of the hub mounting hole 6 of the optical disk 2 is aligned with the origin, i.e., the axis of the loading rod 56.

Figure 12:
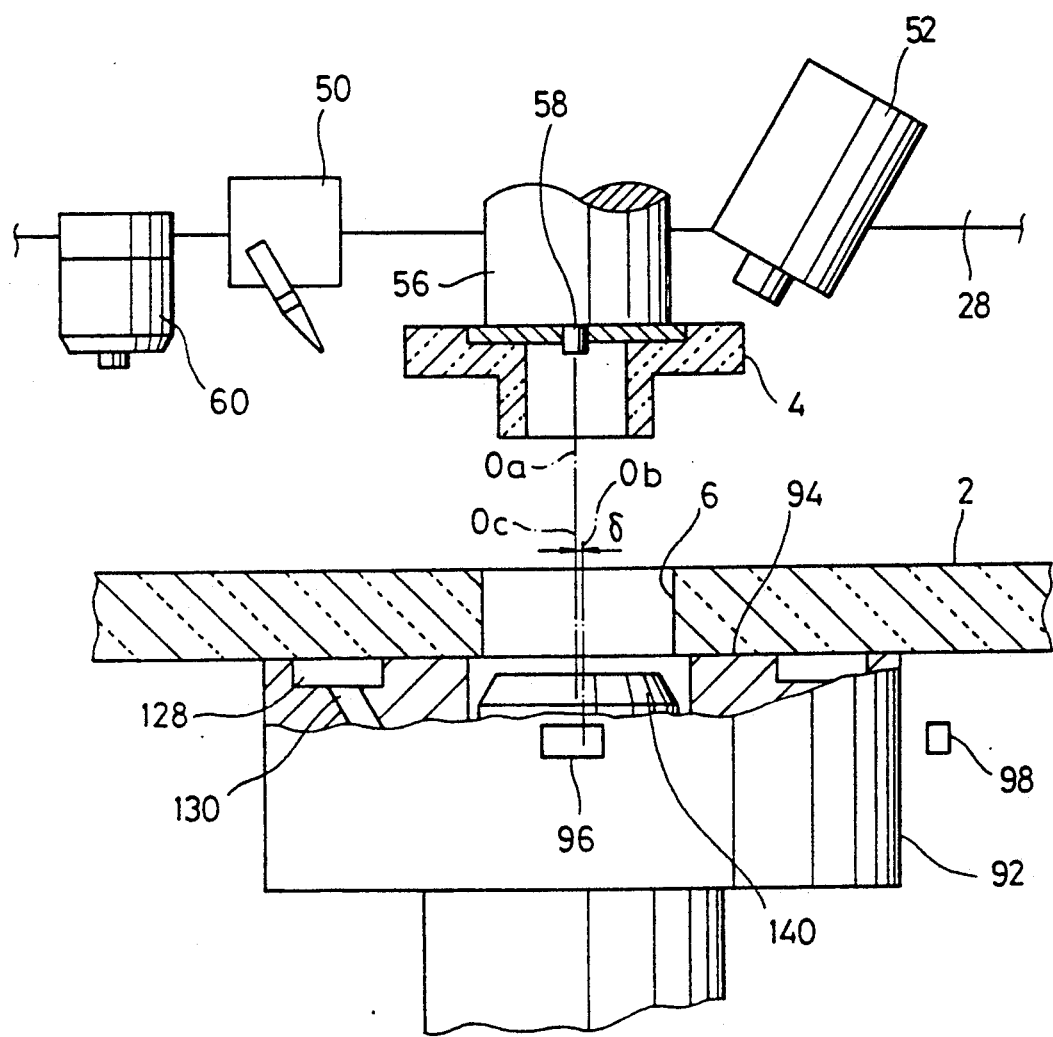

Then, as shown in FIG. 12, the positioning pin 138 is retracted into the turntable portion 92 by the driving unit 142 (FIG. 8), whereby the optical disk 2 is placed on the mount surface 94 of the turntable portion 92 with the axis of the hub mounting hole 6 aligned with the origin. At this time, the vacuum source 134 shown in FIG. 8 is operated to exhaust the air in the annular groove 128 through the passages 132, 120, and 130 of the disk mount 86, and accordingly, the optical disk 2 is securely sucked and fixed on the mount surface 94 of the turntable portion 92.

The Z-axis stage 28 is lowered toward the turntable portion 92 and stopped at a predetermined position, as shown in FIG. 12, and the track of the optical disk 2 is inspected in this position, as needed. The above-mentioned tracking device 48 is used for the inspection.

In this inspection, first, the focal point of the laser beam emitted form the optical pickup 60 of the tracking device 48 is set on a desired turn of the track of the optical disk 2 by the automatic focusing mechanism 68, with the aid of the actuator 66. Then, the turntable portion 92 is rotated with the optical disk 2 thereon, and the optical pickup 60 follows the track to be detected, with the aid of the automatic follow-up mechanism 70 and the automatic focusing mechanism 68, in accordance with the light intensity of the laser beam reflected by the pits on the track. In this case, if the optical pickup 60, i.e., the focal point of the laser beam emitted from the optical pickup 60, follows the desired track and deviates in the radial direction, this deviation, namely, the displacement of the optical pickup 60, is detected by the above-mentioned displacement sensor 72, which then supplies a signal corresponding to the detected displacement to the electronic controller 116 shown in FIG. 7. As a signal from the rotary encoder 110 is also supplied, the electronic controller 116 can calculate the magnitude of the track deviation relative to the angle of rotation of the optical disk 2, i.e., the track being detected. Based on the calculated magnitude of the track deviation, the electronic controller 116 calculates an amount δ of deviation of the center Oc of the track on the optical disk 2 from the axis Oa of the loading rod 56, i.e., the reference line, and a direction of the deviation. Then, the electronic controller 116 supplies drive signals based on the amount δ of the deviation of the center Oc of the track, to the drivers 112 and 114, respectively, to operate the driving motors 78 and 80 of the X-Y stage 32 such that the center Oc of the track is aligned with the origin, i.e., the axis Oa of the loading rod 56, as shown in FIG. 12.

Figure 13:
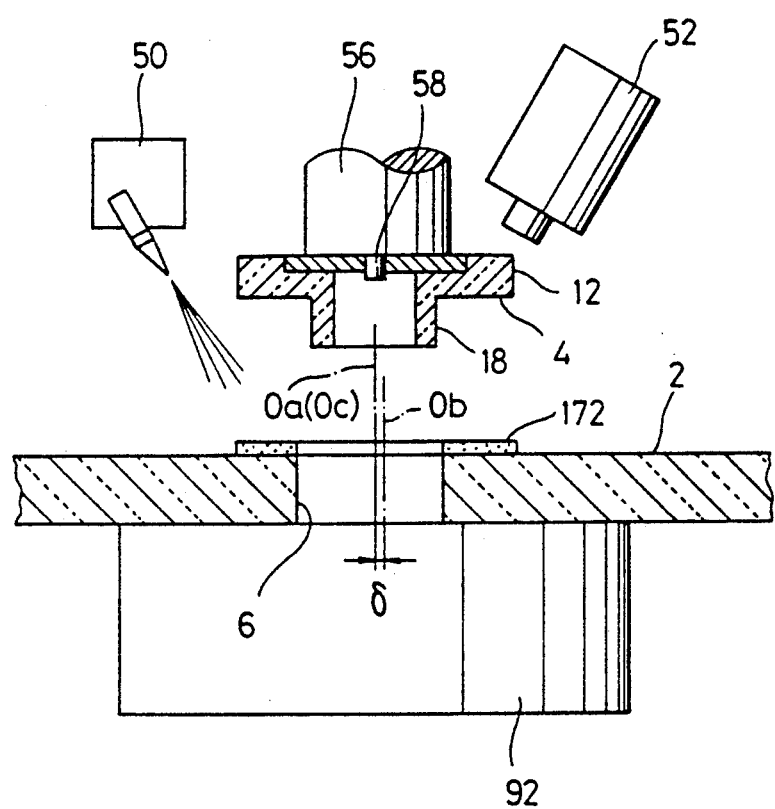

Thereafter, an ultraviolet-curing adhesive is discharged from the nozzle 50 toward that region of the upper surface of the optical disk 2 which surrounds the hub mounting hole 6, as shown in FIG. 13, and simultaneously, the optical disk 2 is rotated once, whereby an annular adhesive layer 172 surrounding the hub mounting hole 6 is formed on the upper surface of the optical disk 2.

Figure 14:
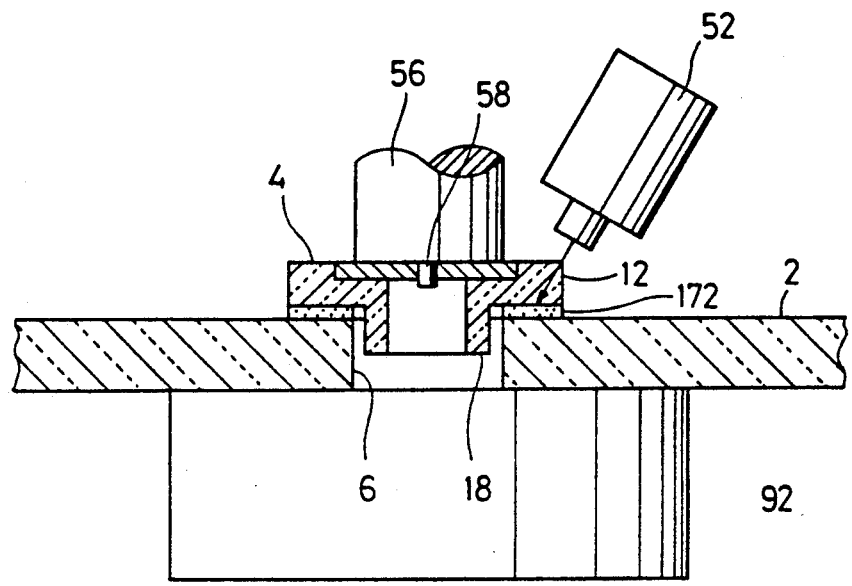

Then, rotation of the optical disk 2 is stopped and the Z-axis stage 14 is further lowered, so that the hub 4 attracted by the loading rod 56 is mounted to the optical disk 2, with the cylindrical portion 18 thereof inserted into the hub mounting hole 6 of the optical disk 2 and the resin plate 12 placed on the adhesive layer 172, as shown in FIG. 14. After the hub 4 is mounted to the optical disk 2, an ultraviolet radiation is emitted from the ultraviolet radiation device 52, as shown in FIG. 14, and accordingly, the adhesive layer 172 irradiated with the ultraviolet radiation is immediately cured and the hub 4 is bonded to the optical disk 2. Since the resin plate 12 of the hub 4 is transparent, the ultraviolet radiation from the ultraviolet radiation device 52 can be reliably radiated onto the adhesive layer 172, and by rotating the optical disk 2 simultaneously with the radiation, the adhesive layer 172 can be progressively cured in the circumferential direction of the hub mounting hole 6. The ultraviolet radiation device 52 comprises an ultraviolet radiation source, an optical fiber connected to the ultraviolet radiation source for passing an ultraviolet radiation therethrough, a focusing lens for converging the ultraviolet radiation emitted from the optical fiber to the adhesive layer 172, etc.

Figure 15:
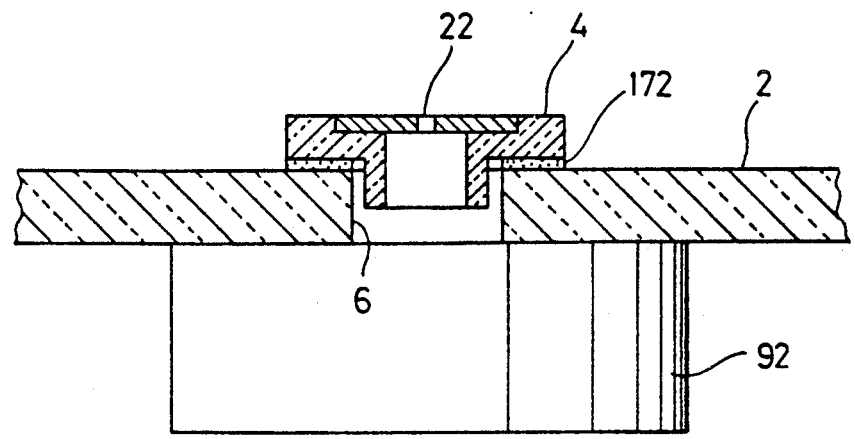

The electromagnet 54 of the chuck 46 is then deenergized and the Z-axis stage 28 is moved up to the predetermined position, whereby the loading rod 56 is detached from the hub 4, as shown in FIG. 15. The optical disk 2 to which the hub 4 has been mounted can be extracted upon stopping the suction of the optical disk 2 by means of the suction groove 128.

This invention is not limited to the above-described first embodiment, but various modifications are possible as described below.

In the first embodiment, a pair of displacement sensors 96 and 98 are used to align the axis Ob of the disk mount 86 with the axis Oa of the loading rod 56, i.e., the reference line, but the second embodiment uses a master optical disk M, instead of the displacement sensors 96 and 98, for the same purpose. A hub H similar to the aforementioned hub 4 is already mounted to the master optical disk M, and the master disk M is produced such that the axis of the spindle hole 22 is accurately aligned with the center Om of the track Tm.

Accordingly, when the master disk M is held by the loading rod 56 of the chuck device 46 through the hub H, as shown in FIG. 16, the axis Oa of the loading rod 56, i.e., the origin, and the center Om of the track of the master disk M are exactly aligned with each other. Then, with the tapered portion 140 of the positioning pin 138 of the disk mount 86 retracted into the turntable portion 92, the Z-axis stage 28 is lowered, and accordingly, the master disk M is placed on the mount surface 94 of the turntable portion 92. Simultaneously, the master disk M is sucked and securely fixed on the mount surface 94, as described above.

Figure 19:
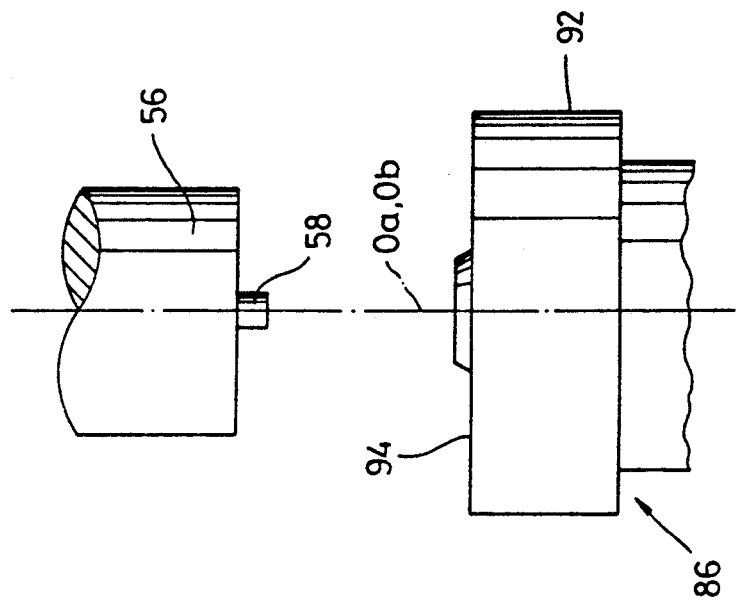
Figure 18:
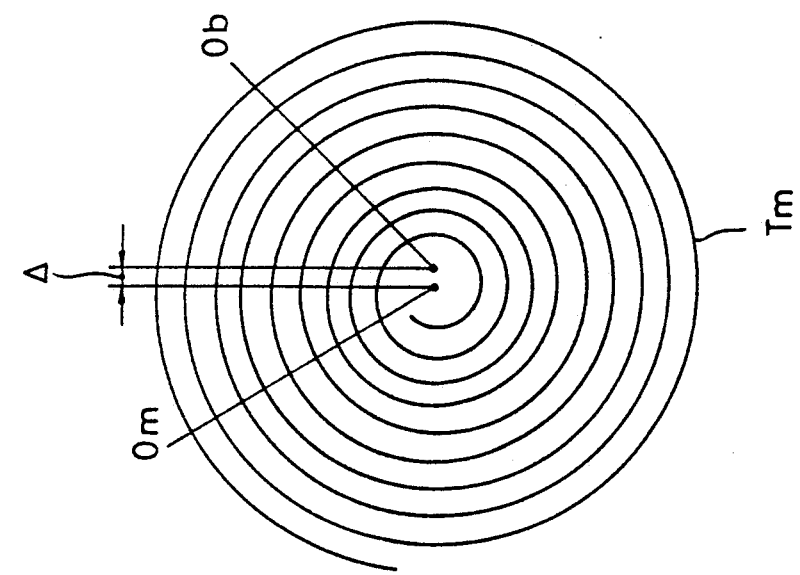

Then, as shown in FIG. 17, the Z-axis stage 28 is raised to the predetermined position where the aforesaid tracking device 48 is operable, and while rotating the master disk M, the tracking device 48, namely, the optical pickup 60, is operated in the same manner as described with reference to the first embodiment, to determine whether or not the axis Ob of the turntable portion 92 is in alignment with the center Om of the track of the master disk M. Namely, the master optical disk M on the turntable portion 92 is rotated about the axis Ob of the turntable portion 92, and if the axis Ob is deviated by Δ from the center Om of the track or the axis Oa of the loading rod 56, as shown in FIGS. 17 and 18, a signal corresponding to the deviation Δ is supplied to the electronic controller 116 from the displacement sensor 72 of the tracking device 48. The electronic controller 116 is also supplied with a signal from the rotary encoder 100, as mentioned above, and accordingly, supplies drive signals corresponding to the deviation Δ to the drivers 112 and 124, respectively. The driving motors 78 and 80 are operated such that the axis Ob of the turntable portion 92 is aligned with the axis Oa of the loading rod 56 or the origin, as shown in FIG. 19.

After the alignment of the axis Ob of the turntable portion 92 with the origin is carried out in the above manner, the master optical disk M is detached from the turntable portion 92, and the hub 4 is mounted to the optical disk 2, as in the case of the first embodiment.

Figure 20:
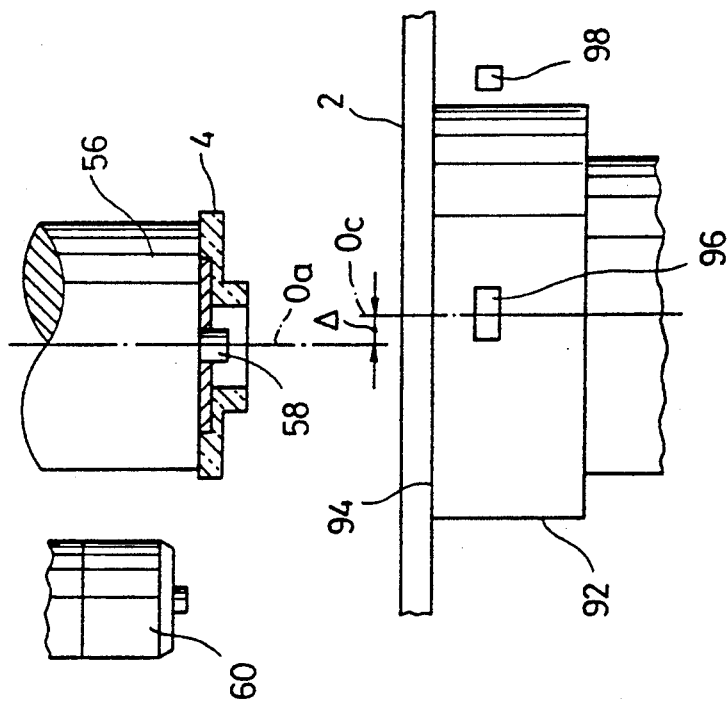

In the first and second embodiments described above, the axis Ob of the turntable portion 92 is aligned with the axis Oa of the loading rod 56, i.e., the origin, before the hub 4 and the optical disk 2 are fed to the loading rod 56 and the turntable portion 92, respectively, and if it is thereafter detected that the center Oc of the track of an actual optical disk 2 is deviated from the origin, fine adjustment of the X-Y stage 32 is carried out again to bring the center Oc of the track exactly to the axis Oa of the loading rod 56. In the third embodiment, in contrast, as shown in FIG. 20, the hub 4 and the optical disk 2 are first fed to the loading rod 56 and the mount surface 94 of the turntable portion 92, respectively, and then, as in the first embodiment, the alignment of the axis of the turntable portion 92 with the axis Oa of the loading rod 56 is carried out.

Figure 21:
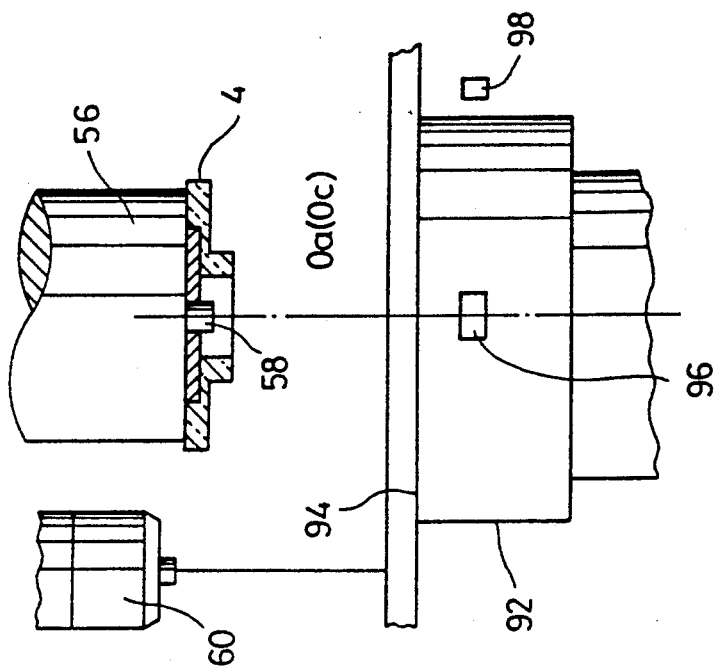
FIGS. 20 and 21 are diagrams showing a third embodiment of this invention, in which is illustrated a process of positioning a disk mount.

Thereafter, with the elements positioned as shown in FIG. 21, the tracking device 48 is operated while rotating the turntable portion 92, i.e., the optical disk 2, and, in accordance with signals from the displacement sensor 72 of the tracking device 48 and the rotary encoder 100, the electronic controller 116 calculates the amount Δ by which the center Oc of the track is deviated from the axis Ob of the turntable portion 92 and a direction of the deviation. Accordingly, as in the first embodiment, by operating the driving motors 78 and 80 of the X-Y stage 32, the center Oc of the track of the optical disk 2 can be accurately brought to a position aligned with the axis of the loading rod 56, i.e., the origin, as shown in FIG. 21.

Thereafter, the hub 4 is mounted to the optical disk 2 in the same manner as in the case of the first embodiment.

To calculate the amount Δ and direction of the deviation of the center Oc of the track by using the tracking device 48, the turntable portion 92 need be rotated by an angle such that the track to be detected makes at least one rotation. Further, the turn of the track to be detected may be a desired one, and if necessary, the track inspection may be performed on the entire length of the track. This applies similarly to the foregoing embodiments.

Figure 22:
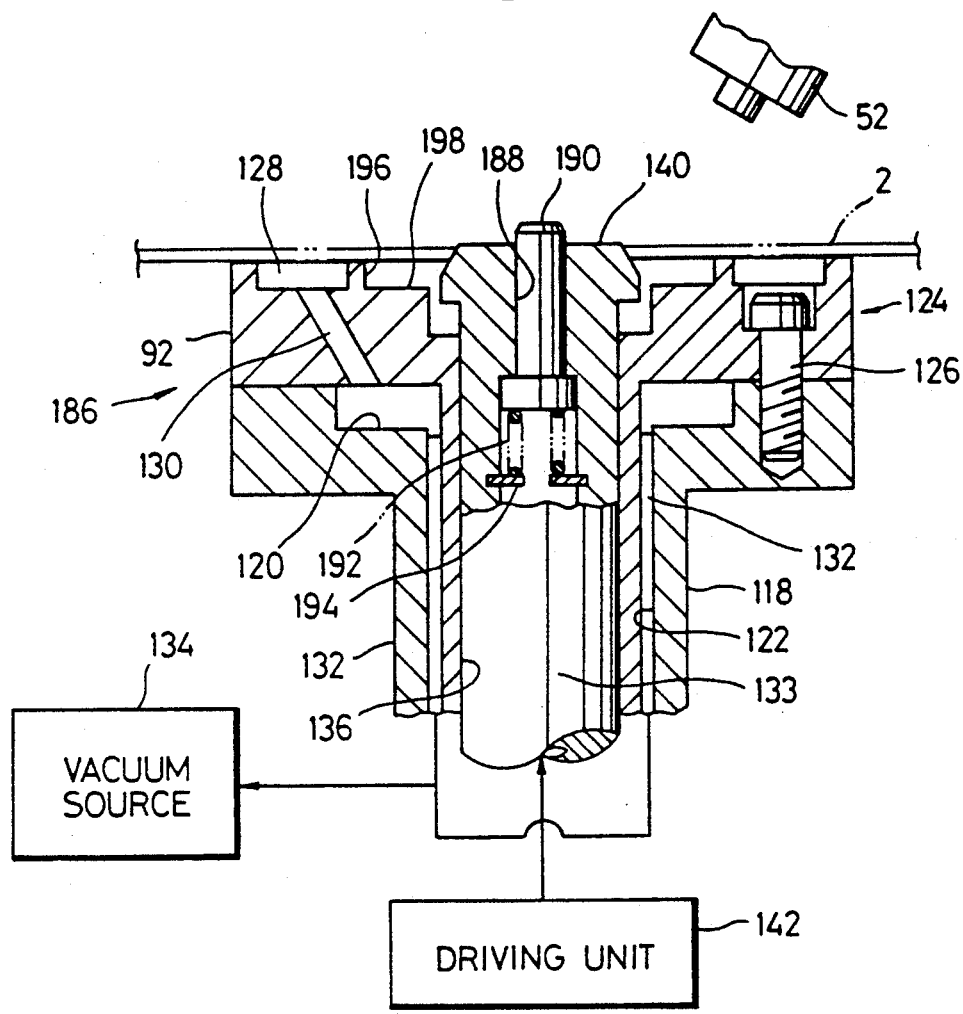
FIG. 22 is a sectional view of part of a disk mount, illustrating a fourth embodiment of this invention.

The foregoing embodiments all describe a system for mounting the hub 4 constituted by a metal plate 20 and a transparent body 10 to the optical disk 2; FIG. 22 shows a disk mount 186 according a fourth embodiment of this invention in which a hub made solely of a metallic material is mounted to the optical disk 2 by using an ultraviolet-curing adhesive. The disk mount 186 is almost the same in arrangement as the disk mount 86 of the first embodiment shown in FIG. 8, and accordingly, the same reference numerals are used to indicate parts having the same function as the corresponding ones in FIG. 8 and description thereof is omitted. The disk mount of this embodiment differs from the disk mount 86 in the following respects.

A stepped hole 188 is bored through the positioning pin 138 concentrically therewith, the upper end of the stepped hole 188 being open in the upper surface of the tapered portion 140 of the positioning pin 138. A center pin 190 is slidably fitted in the stepped hole 188, and is always pushed upward by a compression coil spring 192 arranged in the large-diameter portion of the stepped hole 188 such that the upper end thereof is projected from the upper surface of the tapered portion 140 by a predetermined length. In FIG. 22, reference numeral 194 denotes a spring seat of the coil spring 192. The lower end portion of the center pin 190 is larger in diameter than the upper portion thereof, and is abutted against the shoulder portion of the stepped hole 188. Accordingly, the shoulder portion determines the length by which the upper end portion of the center pin 190 is projected.

Figure 23:
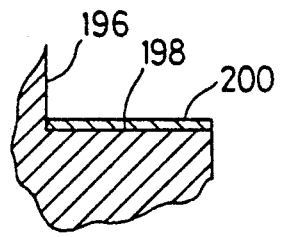
FIG. 23 is a sectional view showing part of another disk mount.

An annular recess 196 is formed in the mount surface 94 of the turntable portion 92, which recess has a diameter smaller than that of the annular groove 128 and is continuous with the upper end of the axial hole 136 for receiving the positioning pin 138. As seen from FIG. 22, the bottom surface of the annular recess 196 is located so as to surround the tapered portion 140 of the positioning pin 138. In this embodiment, the bottom surface 198 of the recess 196 is designed to function as a reflective surface capable of reflecting an ultraviolet radiation. Accordingly, the bottom surface 198 of the recess 196 is defined by a stainless steel and polished to form a specular surface, thereby easily providing a reflective surface. To increase the reflectivity for ultraviolet radiation, aluminum may be vapor-deposited on the bottom surface 198 of the recess 196 to form a reflective layer 200, as shown in FIG. 23.

Figure 24:
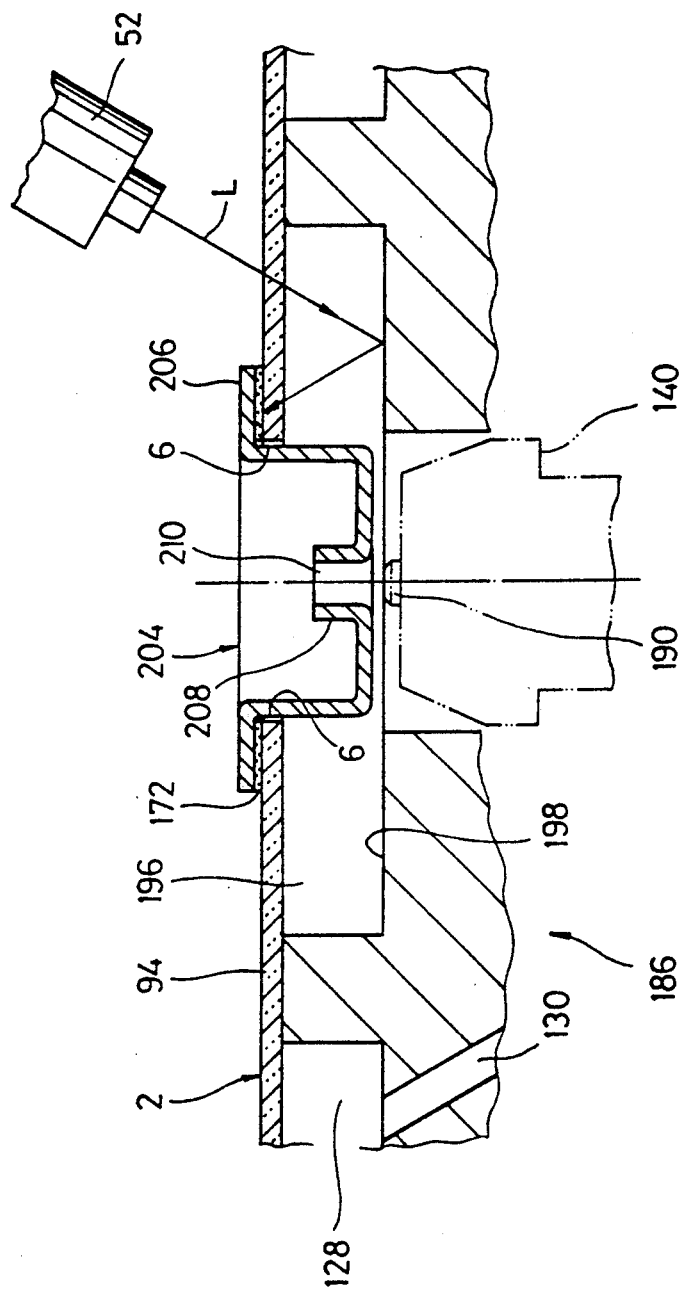
FIG. 24 is a diagram illustrating a process of bonding a hub to an optical disk, carried out by using the disk mount of FIG. 22.

In this embodiment, a hub 204 is made of a magnetic, metallic material and has the form of a cup open at an upper end and closed at a lower end, as shown in FIG. 24. A flange 206 having a diameter larger than that of the hub mounting hole 6 of the optical disk 2 is formed integrally at the upper edge of the hub 204, and a boss 208 integrally projects from the central portion of the bottom surface of the hub 204 to the inside thereof. A hole 210 bored through the boss 208 has a function similar to that of the aforementioned spindle hole 22.

As in the first embodiment, the hub 204 is set at a position above the disk mount 186 with the pin 58 of the loading rod 56 inserted into the hole 210 of the boss 208.

Accordingly, in this state, the axis of the hub 204, i.e., the axis of the hole 210, is in alignment with the axis of the loading rod 56, i.e., the origin. The alignment of the axis Ob of the disk mount 56 with the origin, feeding of the optical disk 2 onto the mount surface 94 of the disk mount 186, alignment of the center Oc of the track of the optical disk 2 with the origin, and application of an ultraviolet-curing adhesive are carried out in the same manner as in the first embodiment.

According to this embodiment, as shown in FIG. 24, an ultraviolet radiation L emitted from the ultraviolet radiation device 52 passes through the optical disk 2 and falls on the bottom surface 198 of the aforesaid recess 196. The incident angle of the ultraviolet radiation with respect to the bottom surface 198 is set to a value such that the ultraviolet radiation reflected by the bottom surface 198 passes again through the optical disk 2 and is applied to the adhesive layer 172. Accordingly, in this embodiment, even if the hub 204 is made of a metal, the adhesive layer 172 between the flange 206 of the hub 204 and the optical disk 2 can be irradiated with the ultraviolet radiation, by utilizing the reflective surface 198 of the recess 196, whereby the hub 204 can be reliably bonded to the optical disk 2.

Figure 25:
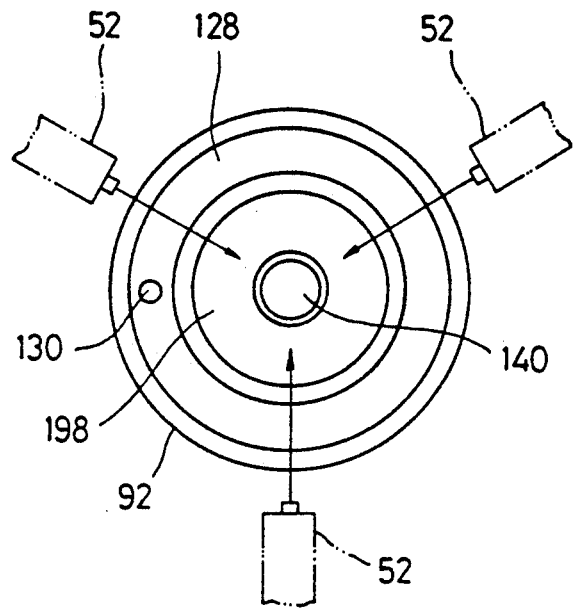
FIG. 25 is a plan view showing an arrangement of an ultraviolet radiation device relative to the disk mount of FIG. 23.

In the above embodiments, the turntable portion 92 is rotated when an ultraviolet radiation is emitted to the adhesive layer 172. If, as shown in FIG. 25, three ultraviolet radiation devices 52 are used and located at equal distances around the adhesive layer in the circumferential direction, the adhesive layer can be cured in spots. In this case, since it is not necessary to form an adhesive layer on the entire inner peripheral edge portion of the optical disk 2 around the hub mounting hole 6, three nozzles 50 may be provided corresponding to the three ultraviolet radiation devices 52.

Figure 26:
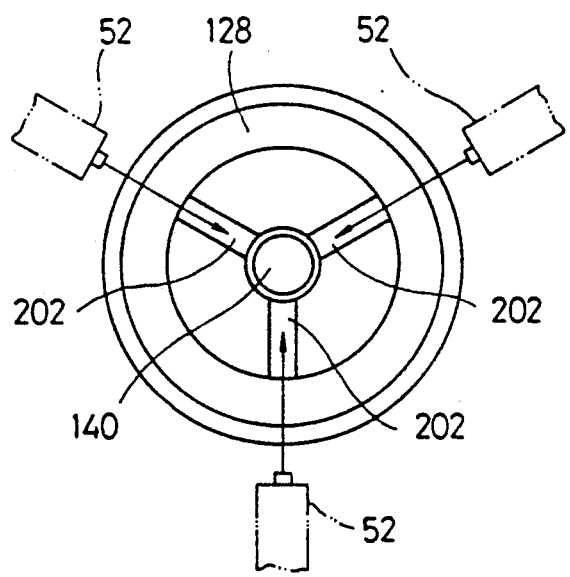
FIG. 26 is a plan view showing a modification of the disk mount of FIG. 23.

In the embodiment of FIG. 25, not the entire bottom surface 198 of the recess 196 need serve as the reflective surface, and therefore, three radiation grooves 202 corresponding to the three ultraviolet radiation devices 52 may be formed, instead of the annular groove 196, as shown in FIG. 26, and the bottom surfaces of these radiation grooves 202 may be used as the reflective surfaces.

Figure 27:
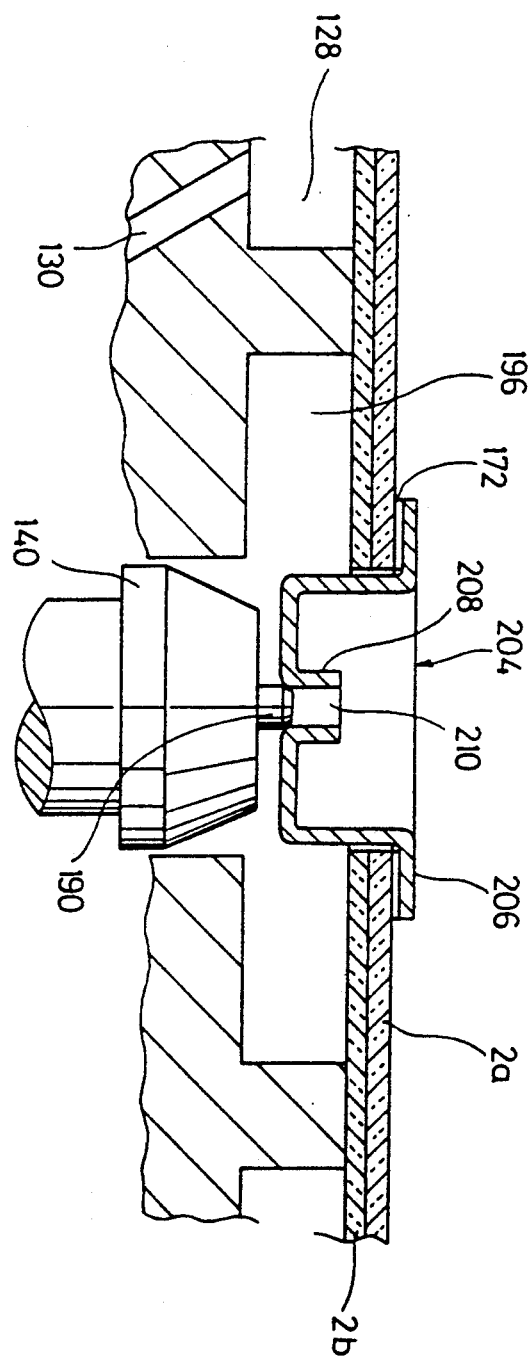
FIG. 27 is a diagram for illustrating the function of a center pin in FIG. 22.

The embodiment shown in FIG. 22 includes the center pin 190 and the hole 210. The functions of these elements will be understood from FIG. 27, namely, the center pin 190 is used for axis alignment of optical disks when producing a double-sided type optical disk by superposing one optical disk provided with a hub on another optical disk, as shown in FIG. 27.

Furthermore, in the above embodiments, the tracking device 48 includes the displacement sensor 72 for detecting a displacement of the pickup 60, but the function of the displacement sensor 72 may be provided by the aforementioned automatic follow-up mechanism 70. Namely, the automatic follow-up mechanism 70 inherently has the function of moving the pickup 60 to follow the track of an optical disk, and the amount of displacement of the pickup 60 may be obtained from an amount by which the pickup 60 is moved by the automatic follow-up mechanism 70 in the radial direction of the optical disk, when the pickup 60 is following a rotating optical disk.

What is claimed is:

1. A system for mounting a hub having a spindle hole to a transparent optical disk, the optical disk having a circular opening at a central portion thereof into which the hub is to be fitted, and a data recording surface formed on one surface thereof and having one spiral recording track pre-defined thereon around the circular opening, the system comprising:

means for defining a reference axis;

a station movable in a reference plane perpendicular to the reference axis, the movable station including a disk mount which is rotatable in a plane parallel to the reference plane and a mount surface for receiving an optical disk thereon, the mount surface being perpendicular to the reference plane;

disk feeding means for feeding an optical disk onto the mount surface with an axis of the optical disk aligned with an axis of the disk mount;

suction means for sucking an optical disk against the mount surface and thereby holding the optical disk when the optical disk is supplied to the mount surface, the suction means permitting the optical disk to be rotated together with the disk mount;

detecting means for detecting the distance and direction of a deviation of the center of the recording track of the optical disk from the reference axis, when the optical disk held on the mount surface of the disk mount is rotated together with the disk mount, and for outputting a deviation signal corresponding to the detected distance and direction of the deviation, the detecting means including an optical pickup movable in a radial direction of the optical disk to follow up the recording track while sensing same during a rotation of the optical disk, a displacement sensor for detecting a radial displacement of the optical pickup and outputting a displacement signal corresponding to the detected displacement, and a rotational angle sensor for detecting a rotational angle of the optical disk and outputting an angle signal corresponding to the detected rotational angle;

positioning means for controlling the movement of the movable station in accordance with the deviation signal from the detecting means, such that the center of the recording track is aligned with the reference axis;

hub feeding means for feeding a hub onto the optical disk on the mount surface, with the axis of the spindle hole of the hub aligned with the reference axis, such that the center opening of the optical disk is closed by the hub, the hub having an outer peripheral portion which is superposed on a portion of the optical disk around the center opening when the hub is placed on the optical disk; and bonding means for bonding the outer peripheral portion of the hub to the optical disk when the hub is placed on the optical disk.

2. A system according to claim 1, wherein the outer peripheral portion of said hub is made of a transparent material, and said bonding means comprises applicator means for applying an ultraviolet-curing adhesive to a portion of the optical disk on which the outer peripheral portion of the hub is to be placed, when the optical disk is supplied to the disk mount; and ultraviolet radiation means for radiating an ultraviolet radiation onto the adhesive through the transparent outer peripheral portion of the hub when the hub is supplied to the optical disk which has the adhesive applied thereon by the applicator means, to thereby cure the adhesive.

3. A system according to claim 2, wherein:

said applicator means includes a single applicator device for applying the ultraviolet-curing adhesive to said portion of the optical disk while the optical disk is rotated together with the disk mount, to thereby form an annular adhesive layer on the optical disk; and said ultraviolet radiation means includes a single radiation device for applying an ultraviolet radiation over the entire circumference of the adhesive layer while the optical disk is rotated together with the disk mount.

4. A system according to claim 1, wherein said hub is made of an opaque metallic material inclusive of the outer peripheral portion thereof, and said bonding means comprises applicator means for applying an ultraviolet-curing adhesive to a portion of the optical disk on which the outer peripheral portion of the hub is to be placed, when the optical disk is supplied to the disk mount; an ultraviolet reflection surface provided at the mount surface of the disk mount, for reflecting an ultraviolet radiation; and ultraviolet radiation means for radiating an ultraviolet radiation onto the adhesive when the hub is supplied to the optical disk which has the adhesive applied thereon by the applicator means, in such a manner that the ultraviolet radiation from the ultraviolet radiation means is passed through the optical disk, reflected by the ultraviolet reflection surface, and then radiated to the adhesive through the optical disk.

5. A system according to claim 4, wherein:

said applicator means includes a single applicator device for applying the ultraviolet-curing adhesive to said portion of the optical disk while the optical disk is rotated together with the disk mount, to thereby form an annular adhesive layer on the optical disk; and said ultraviolet radiation means including a single radiation device for applying an ultraviolet radiation over the entire circumference of the adhesive layer by using the ultraviolet reflection surface, while the optical disk is rotated together with the disk mount.

6. A system according to claim 4, wherein:

said applicator means includes a plurality of applicator devices for applying the ultraviolet-curing adhesive to said portion of the optical disk at circumferentially equal intervals while rotation of the optical disk is stopped;

said ultraviolet reflection surface includes a plurality of reflection surfaces formed in the mount surface of the disk mount corresponding to positions at which the adhesive is applied; and said ultraviolet radiation means includes a plurality of radiation devices for applying an ultraviolet radiation to the adhesive applied to the optical disk, by using corresponding ones of the reflection surfaces.

7. A system according to claim 5, wherein said disk mount has a recess formed in the mount surface thereof concentrically with the axis thereof and having a diameter larger than the outer diameter of the hub, a bottom surface of the recess forming said ultraviolet reflection surface.

8. A system according to claim 7, wherein said bottom surface of the recess is polished to form a specular surface.

9. A system according to claim 7, wherein aluminum is vapor-deposited on the bottom surface of the recess to form a reflective layer.

10. A system according to claim 1, which further comprises:

second detecting means for detecting the distance and direction of a deviation of the axis of the disk mount from the reference axis and for outputting a second deviation signal corresponding to the detected distance and direction of the deviation; and provisional positioning means for controlling the movement of the movable station in accordance with the second deviation signal from the second detecting means, to thereby align in advance the axis of the disk mount with the reference axis.

11. A system according to claim 10, wherein said movable station comprises: a stage movable in said reference plane in first and second directions perpendicular to each other;

a first motor for moving the stage in the first direction; and a second motor for moving the stage in the second direction.

12. A system according to claim 11, wherein said second detecting means comprises first and second distance sensors arranged in the vicinity of a peripheral surface of the disk mount, said first distance sensor providing a first distance signal corresponding to a distance of the peripheral surface of the disk mount therefrom taken in the first direction, said second distance sensor providing a second distance signal corresponding to a distance of the peripheral surface of the disk mount therefrom taken in the second direction, and said positioning means including:

a first comparator, which is supplied with the first distance signal, in which a first reference value corresponding to a first distance signal output from the first distance sensor when the axis of the disk mount is aligned with the reference axis is set, and which outputs a first differential signal corresponding to a difference between the first distance signal and the first reference value, a second comparator, which is supplied with the second distance signal, in which a second reference value corresponding to a second distance signal output from the second distance sensor when the axis of the disk mount is aligned with the reference axis is set, and which outputs a second differential signal corresponding to a difference between the second distance signal and the second reference value, a first driver supplied with the first distance signal from the first comparator, for driving the first motor to move the stage such that the value of the first distance signal coincides with the first reference value, and a second driver supplied with the second distance signal from the second comparator, for driving the second motor to move the stage such that the value of the second distance signal coincides with the second reference value.

13. A system according to claim 11, wherein said second detecting means further includes:

a master optical disk to which a hub is already fitted and which is fed to the mount surface of the disk mount by means of the hub feeding means, the master optical disk having one spiral master recording track having a center thereof aligned with the axis of the hub, said displacement sensor for detecting a displacement of the optical pickup following up the master recording track of the master optical disk when the master optical disk supplied to the mount surface of the disk mount is rotated together with the disk mount, and for outputting a second displacement signal corresponding to the detected displacement, said rotational angle sensor including means for detecting a rotational angle of the master optical disk, and calculating means, which is supplied with the second displacement signal and the angle signal from the displacement sensor and the rotational angle sensor, respectively, and for subjecting the received signals to an arithmetic operation, the calculating means calculating the distance and direction of a deviation of the center of the master recording track from the axis of the disk mount, on the basis of the second displacement signal and the angle signal, and outputting a second deviation signal which finally represents the distance and direction of the deviation of the axis of the disk mount from the reference axis, and said provisional positioning means including driver means for controlling the operation of the first and second motors in accordance with the second deviation signal from the calculating means, to move the stage such that the axis of the disk mount is aligned with the reference axis.

14. A system according to claim 9, wherein said first detecting means further includes second calculating means which is supplied with the first displacement signal and the angle signal from the displacement sensor and the rotational angle sensor, respectively, and for subjecting the first displacement signal and the angle signal to an arithmetic operation, the second calculating means calculating the distance and direction of a deviation of the master recording track from the reference axis, on the basis of the first displacement signal and the angle signal, and outputting a first deviation signal representing the calculated distance and direction of the deviation, and said provisional positioning means including second driver means for controlling the operation of the first and second motors in accordance with the first deviation signal from the second calculating means, to move the stage such that the center of the recording track of the master optical disk is aligned with the reference axis.

15. A system according to claim 14, wherein:
said first and second calculating means comprise a single calculating means; and
said first and second driver means comprise a single driver means.

16. A system according to claim 1, wherein:
said hub has a magnetically attractable metallic portion at a central portion thereof; and
said hub feeding means includes a chuck movable along the reference axis, the chuck having an electromagnet, a yoke toward which the metallic portion of the hub is attracted by the electromagnet, and a pin projecting from the yoke and inserted into the spindle hole of the hub.

17. A system according to claim 1, wherein said suction means includes an annular groove formed in the mount surface of the disk mount, and a vacuum source which is connected to the annular groove and to which air in the annular groove is discharged.

18. A system according to claim 1, wherein said optical disk feeding means includes a positioning pin arranged in the disk mount coaxially with the axis thereof and movable along said axis, the positioning pin being projectable from and retractable into the mount surface and having a tapered portion insertable into the center opening of the optical disk, whereby, when the optical disk is placed on the mount surface with the tapered portion of the positioning pin projected from the mount surface, the tapered portion is fitted into the center opening of the optical disk and thereby the axis of the disk mount and the axis of the optical disk are aligned with each other.

19. A system according to claim 18, wherein said positioning pin further includes a center pin projectable from the tapered portion coaxially therewith and insertable into the spindle hole of the hub.

* * * * *